United States Patent
Saito et al.

(10) Patent No.: US 10,917,210 B2
(45) Date of Patent: Feb. 9, 2021

(54) USER TERMINAL AND WIRELESS COMMUNICATION METHOD

(71) Applicant: NTT DOCOMO, INC., Tokyo (JP)

(72) Inventors: Keisuke Saito, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/323,065

(22) PCT Filed: Aug. 2, 2017

(86) PCT No.: PCT/JP2017/028120
§ 371 (c)(1),
(2) Date: Feb. 4, 2019

(87) PCT Pub. No.: WO2018/025928
PCT Pub. Date: Feb. 8, 2018

(65) Prior Publication Data
US 2019/0182005 A1    Jun. 13, 2019

(30) Foreign Application Priority Data
Aug. 5, 2016  (JP) ................................ 2016-154822

(51) Int. Cl.
*H04L 5/00* (2006.01)
*H04W 72/04* (2009.01)

(52) U.S. Cl.
CPC ........... *H04L 5/0048* (2013.01); *H04W 72/04* (2013.01); *H04W 72/042* (2013.01); *H04W 72/0446* (2013.01)

(58) Field of Classification Search
CPC ........... H04W 72/042; H04W 72/0446; H04W 72/12; H04W 72/0453; H04L 5/0053; H04L 5/0094; H04L 5/0044; H04L 5/0051
(Continued)

(56) References Cited

U.S. PATENT DOCUMENTS

2011/0299508 A1* 12/2011 Suzuki ................... H04L 5/001
  370/336
2016/0087709 A1*  3/2016 Horiuchi ............... H04B 7/068
  375/260

FOREIGN PATENT DOCUMENTS

EP       3298715 A1    3/2018
JP    2016-518578 A    6/2016
(Continued)

OTHER PUBLICATIONS

International Search Report issued in PCT/JP2017/028120 dated Oct. 17, 2017 (5 pages).
(Continued)

*Primary Examiner* — Brenda H Pham
(74) *Attorney, Agent, or Firm* — Osha Bergman Watanabe & Burton LLP

(57) ABSTRACT

A user terminal receives a downstream link data signal, a demodulation reference signal for demodulating the downstream link data signal, and a downstream link signal including a downstream link control signal; calculates a channel estimation value using the demodulation reference signal; demodulates the downstream link data signal using the channel estimation value; and demodulates the downstream link control signal using the channel estimation value calculated from the demodulation reference signal mapped to a symbol before a symbol to which the downstream link control signal is mapped in a sub-frame.

2 Claims, 23 Drawing Sheets

(58) Field of Classification Search
USPC .................................... 370/310.2, 328, 338
See application file for complete search history.

(56) References Cited

FOREIGN PATENT DOCUMENTS

| JP | 2016-518758 A1 * | 6/2016 | ............ H04J 11/00 |
|----|------------------|--------|--------------------------|
| WO | 2010/071039 A1 | 6/2010 | |
| WO | 2016/186699 A1 | 11/2016 | |

OTHER PUBLICATIONS

Written Opinion of the International Searching Authority issued in PCT/JP2017/028120 dated Oct. 17, 2017 (5 pages).

Qualcomm, Ericsson, Panasonic, NTT Docomo, ZTE, Convida, Nokia, ASB, Sony, Intel, "Way Forward on Frame Structure,"; 3GPP TSG RAN WG1 #85, R1-165575; Nanjing, China; May 23-27, 2016 (2 pages).

3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).

Extended European Search Report in counterpart European Application No. 17837030.0 dated Feb. 19, 2020 (8 pages).

* cited by examiner

USER TERMINAL AND WIRELESS COMMUNICATION METHOD

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and/or the like in a Universal Mobile Telecommunication System (UMTS) network (NPL 1). Future systems of LTE (for example, the systems called LTE-A (LTE-Advanced), FRA (Future Radio Access), 5G (5th generation mobile communication system), 5G+(5G plus), and New-RAT (Radio Access Technology)) have been also studied for achieving a broader bandwidth and a higher speed based on LTE.

According to the existing LTE system (for example, LTE Rel. 8-13), in the downlink (DL) between a radio base station and a user terminal, a downlink control channel (for example, Physical Downlink Control Channel (PDCCH); hereinafter, sometimes called "DL control signal") is mapped to forward symbols in each subframe (for example, one to three symbols from the beginning), and downlink data channel (for example, Physical Downlink Shared Channel (PDSCH); hereinafter sometimes called "DL data signal") and a demodulation reference signal for demodulating PDSCH (for example, Demodulation Reference Signal (DMRS)); hereinafter sometimes called "demodulation RS") are mapped to symbols after the PDCCH-mapped symbols in a multiplexed manner.

Meanwhile, according to a future radio communication system (for example, 5G), to achieve latency reduction, mapping of the demodulation RS to the forward symbols in the subframe has been studied (NPL 2). Such a configuration can reduce the processing time required for channel estimation in the subframe and signal demodulation.

The future radio communication system is expected to support broad frequencies and satisfy various requirements. Here, at carrier frequencies (for example, 30 to 70 GHz band) higher than relatively low carrier frequencies used in the existing LTE systems, the antenna element size is small. Accordingly, in the future radio communication system, application of massive Multiple Input Multiple Output (MIMO) that uses many antenna elements as a technology for effectively utilizing a high frequency band has been studied.

However, the higher the carrier frequency is, the larger the distance attenuation of radio waves is. Accordingly, there is a possibility that the coverage becomes small. Accordingly, in the future radio communication system, coverage securement through application of beam forming (BF) by massive MIMO has been studied. In other words, although pre-coding is not applied to PDCCH in LTE, pre-coding is assumed to be applied also to the DL control signal in the future radio communication system.

CITATION LIST

Non-Patent Literature

NPL1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

NPL2
R1-165575, Qualcomm, Ericsson, Panasonic, NTT Docomo, ZTE, Convida, Nokia, ASB, Sony, Intel, "Way Forward On Frame Structure," May 2016

SUMMARY OF INVENTION

Technical Problem

However, in the future radio communication system, the signal configuration (mapping method) of the demodulation RS, the DL control signal and/or the like during DL control signal pre-coding has not been sufficiently studied yet. Accordingly, there is a possibility that a certain signal configuration of demodulation RS, the DL control signal and/or the like increases the overhead of the demodulation RS.

An aspect of the present invention is to provide a user terminal and a radio communication method that can prevent the overhead of the demodulation RS from increasing even in a case where the DL control signal is pre-coded in the future radio communication system.

Solution to Problem

A user terminal according to an aspect of the present invention includes: a receiver that receives a downlink signal including a downlink data signal, a demodulation reference signal, and a downlink control signal; a channel estimator that calculates a channel estimation value, using the demodulation reference signal; and a demodulator that demodulates the downlink data signal, using the channel estimation value, in which the demodulator demodulates the downlink control signal, using the channel estimation value calculated from the demodulation reference signal mapped to a symbol that coincides or precedes a symbol to which the downlink control signal is mapped in a subframe.

Advantageous Effects of Invention

One aspect of the present invention can prevent the overhead of the demodulation RS from increasing even in the case where the DL control signal is pre-coded in the future radio communication system.

DESCRIPTION OF EMBODIMENTS (Development to Present Invention)

In the existing LTE system, beam forming (that is, pre-coding) is not applied to PDCCH. Specifically, in a relatively high carrier frequency band, there is a possibility that the received power (for example, the reception signal to noise ratio (SNR)) decreases without obtaining a beam forming gain, and the PDCCH reception quality is degraded.

If the beam forming is applied to PDCCH, a method of newly mapping a demodulation RS for demodulating PDCCH besides the PDSCH demodulation RS can be considered. However, this method increases the overhead of the demodulation RS, and reduces the resource utilization efficiency.

Furthermore, according to the existing LTE system, DMRS is mapped, in a distributed manner, to symbols in the subframe after the symbols to which PDCCH is mapped. Accordingly, there is a possibility that a DMRS mapping method in the existing LTE system is not suitable as the method of achieving low latency (that is, reduction in processing time) required in the future radio communication system.

Accordingly, the present inventors have studied the signal configuration (mapping method) of the demodulation RS, the DL control signal and/or the like that is suitable for the case of pre-coding the DL control signal, and have achieved the present invention.

Specifically, in a case of mapping the demodulation RS and the DL control signal forward in the subframe, the configuration of the demodulation RS, the DL control signal and/or the like is defined so as to map the demodulation RS to symbols that coincide or precede the symbols to which the DL control signal is mapped, thereby achieving the favorable reception quality of the DL control signal while preventing the overhead and the latency from increasing when the DL control signal is pre-coded.

Hereinafter, each embodiment of the present invention is described in detail with reference to the accompanying drawings.

Embodiment 1

Figure 1:
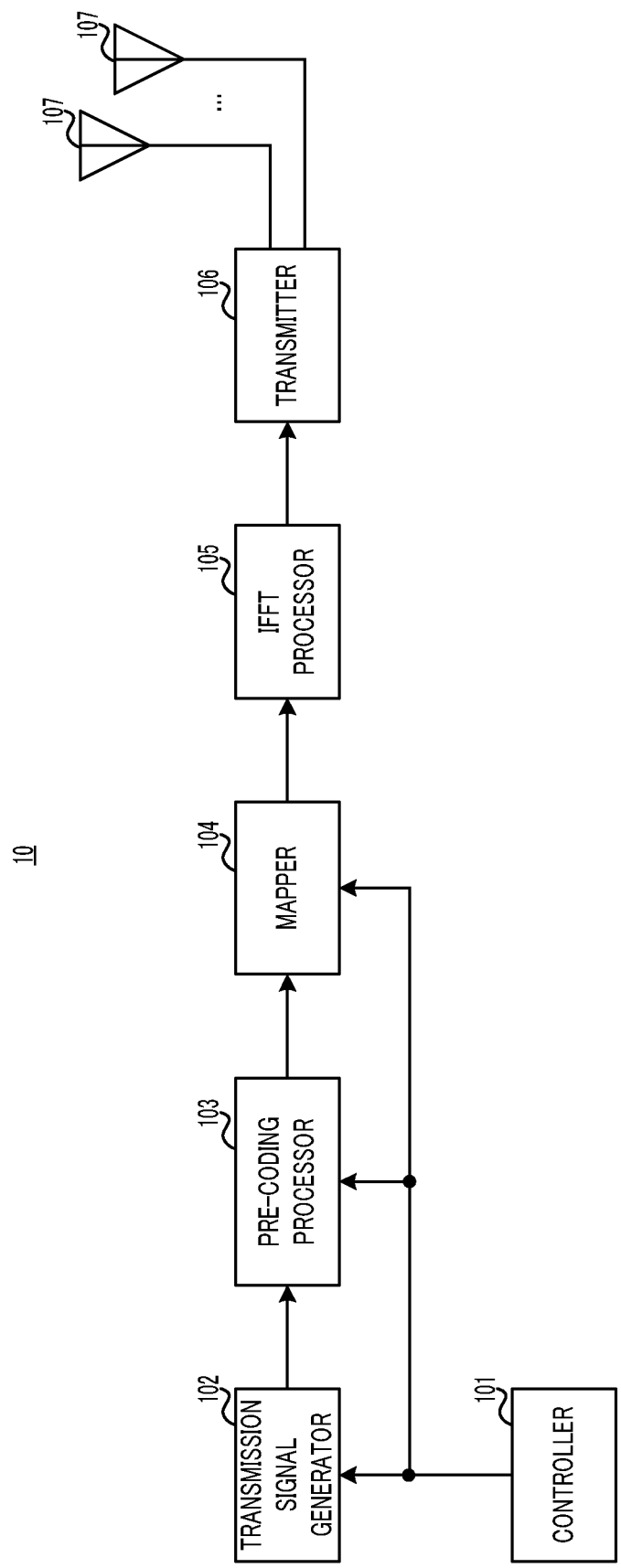
FIG. 1 is a block diagram illustrating a configuration example of a radio base station according to Embodiment 1.
Figure 2:
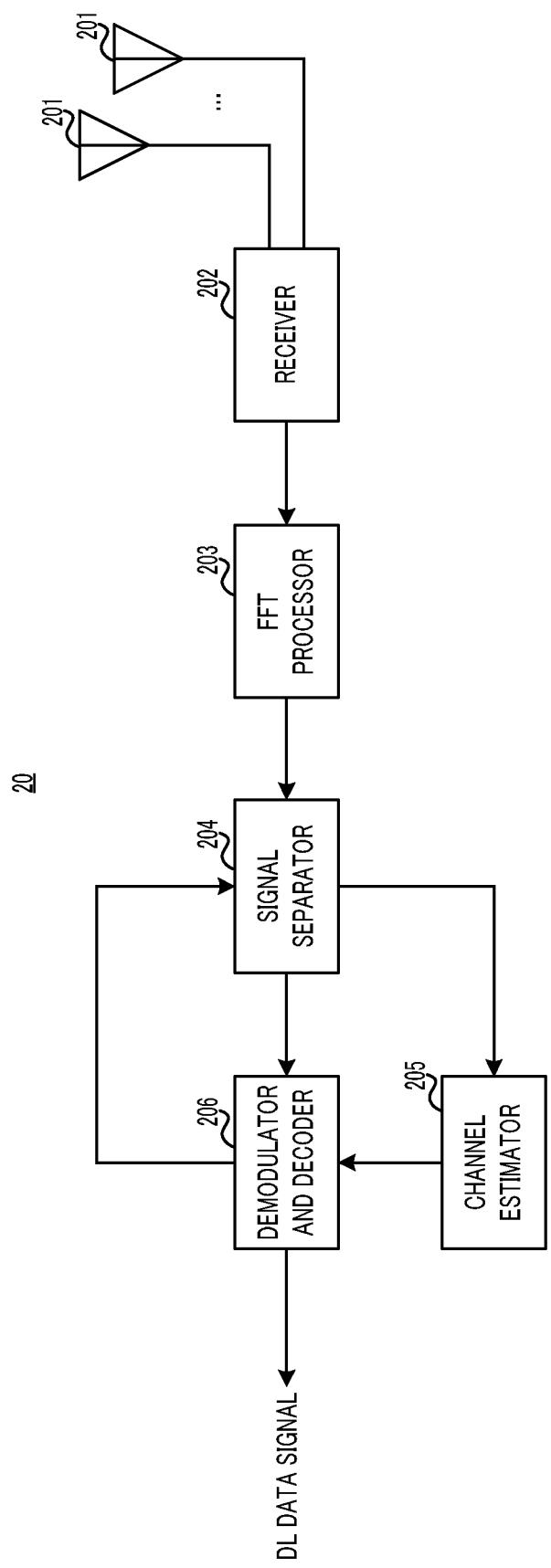
FIG. 2 is a block diagram illustrating a configuration example of a user terminal according to Embodiment 1.

A radio communication system according to Embodiment 1 includes at least radio base station 10 illustrated in FIG. 1, and user terminal 20 illustrated in FIG. 2. User terminal 20 is connected to (accesses) radio base station 10. Radio base station 10 transmits, to user terminal 20, a DL signal that includes a DL data signal (for example, PDSCH), a demodulation RS (for example, DMRS) for demodulating the DL data signal, and a DL control signal (for example, PDCCH).

Radio base station 10 can pre-code the DL control signal in addition to the DL data signal (and the demodulation RS). Radio base station 10 transmits the DL data signal, and the demodulation RS for demodulating the DL data signal, through the identical antenna port. In other words, the port number of the antenna port used for transmitting the DL data signal and the demodulation RS for demodulating the DL data signal is identical. The antenna port is, for example, a unit to be multiplied by a pre-coding vector (sometimes called a pre-coding weight, a weight coefficient and/or the like) during pre-coding.

Radio base station 10 transmits a DL control signal demodulation RS. At this time, in a case where the antenna port (port number) used to transmit the DL control signal is the same as any DL data signal (demodulation RS), radio base station 10 uses the demodulation RS for the DL data signal as the DL control signal demodulation RS. On the contrary, in a case where the antenna port (port number) used to transmit the DL control signal is different from each DL data signal (demodulation RS), radio base station 10 newly maps the DL control signal demodulation RS besides the demodulation RS for the DL data signal.

<Radio Base Station>

FIG. 1 illustrates an example of the entire configuration of the radio base station according to Embodiment 1. Radio base station 10 illustrated in FIG. 1 adopts a configuration that includes controller 101, transmission signal generator 102, pre-coding processor 103, mapper 104, inverse fast Fourier transform (IFFT) processor 105, transmitter 106, and antenna 107.

Controller 101 (scheduler) performs scheduling (for example, resource assignment), such as of the DL data signal, DL control signal, and demodulation RS. Here, controller 101 performs scheduling so as to map the demodulation RS and the DL control signal to forward symbols in the subframe (for example, a predetermined number of symbols from the beginning).

Information (mapping configuration) indicating the resource to which the DL control signal and the demodulation RS are mapped may be indicated to user terminal 20 through higher layer (for example, Radio Resource Control (RRC) or Medium Access Control (MAC)) signaling, or indicated to user terminal 20 via physical layer (PHY) signaling, for example.

Alternatively, the mapping configuration of the DL control signal and the demodulation RS may be uniquely associated with at least one of other parameters (for example, information relating to the system bandwidth, carrier frequency, and DL data signal (for example, mapping pattern and/or the like)). In this case, user terminal 20 can implicitly identify the mapping configuration of the DL control signal and the demodulation RS on the basis of the other parameter. Consequently, signaling for mapping configuration indication can be removed.

The parameter to be indicated as the mapping configuration of the DL control signal and the demodulation RS may be, for example, a mapping pattern that indicates the mapping positions of the DL control signal and the demodulation RS, or the transmission period of each signal, the number of resources to be used, the sequence to be used, the number of antenna ports to be used and/or the like. The value to be indicated may be the configuration values themselves, or index values assigned to the respective configuration value candidates. Use of the index values can reduce the signaling size required for mapping configuration indication in comparison with the case where the indication about the configuration values themselves is issued.

Controller 101 outputs scheduling information that indicates a scheduling result, to transmission signal generator 102 and mapper 104.

Controller 101 controls pre-coding for the DL data signal, the demodulation RS, the DL control signal and/or the like. For example, controller 101 determines presence or absence of application of pre-coding to these signals, and parameters used for application of pre-coding (for example, a pre-coding vector (sometimes called a pre-coding weight, a weight coefficient and/or the like), an antenna port (port number), a transmission rank and/or the like). Controller 101 outputs pre-coding information that indicates the determined parameters, to transmission signal generator 102 and pre-coding processor 103.

Transmission signal generator 102 generates the DL signal (including the DL data signal, the DL control signal, and the demodulation RS). For example, the DL control signal includes downlink control information (DCI) that includes the scheduling information or pre-coding information input from controller 101. Transmission signal generator 102 performs an encoding process and a modulation process for the DL signal. Transmission signal generator 102 outputs the generated DL signal to pre-coding processor 103.

Pre-coding processor 103 pre-codes the DL signal input from transmission signal generator 102, on the basis of the pre-coding information input from controller 101. In a case where pre-coding processor 101 does not pre-code the DL control signal, this processor outputs the DL control signal to mapper 104 without processing.

Mapper 104 maps the DL signal input from pre-coding processor 103, to a predetermined radio resource, on the basis of the scheduling information input from controller 101. Mapper 104 outputs the DL signal mapped to the radio resource, to IFFT processor 105. The details of the method of mapping the demodulation RS and the DL control signal are described later.

IFFT processor 105 performs an IFFT process for a DL signal that is a frequency domain signal input from mapper 104, and outputs a DL signal that is a time domain signal (that is, a signal made up of OFDM symbols) to transmitter 106. In FIGS. 1 and 2, as an example of the signal waveform of the DL signal, a signal waveform based on OFDM modulation is adopted. However, the signal waveform of the DL signal is not limited to the signal waveform based on OFDM modulation. Alternatively, this waveform may be a signal waveform based on another scheme (for example, Single Carrier-Frequency Division Multiple Access (SC-FDMA)).

Transmitter 106 performs transmission processes, such as upconversion and amplification, for the baseband DL signal input from IFFT processor 105, and outputs the DL signal (radio frequency signal) through antenna 107.

<User Terminal>

FIG. 2 illustrates an example of the entire configuration of the user terminal according to Embodiment 1. User terminal 20 illustrated in FIG. 2 adopts a configuration that includes antenna 201, receiver 202, fast Fourier transform (FFT) processor 203, signal separator 204, channel estimator 205, and demodulator and decoder 206.

The DL signal (radio frequency signal) received through antenna 201 is input to receiver 202. The DL signal includes the DL data signal, the demodulation RS, the DL control signal and/or the like.

Receiver 202 performs reception processes, such as amplification and downconversion, for the radio frequency signal received through antenna 201, and outputs the baseband DL signal to FFT processor 203.

FFT processor 203 performs an FFT process for the DL signal that is a time domain signal input from receiver 202, and outputs a DL signal that is a frequency domain signal to signal separator 204.

Signal separator 204 separates (demaps) the demodulation RS and the DL control signal from the DL signal input from receiver 202 on the basis of the mapping configuration of the DL control signal and the demodulation RS, and outputs the demodulation RS to channel estimator 205 and outputs the DL control signal to demodulator and decoder 206.

Signal separator 204 separates (demaps) the DL data signal from the DL signal on the basis of the scheduling information (for example, the assigned resource) input from demodulator and decoder 206, and outputs the DL data signal to demodulator and decoder 206.

Channel estimator 205 performs channel estimation using the demodulation RS input from signal separator 204, and calculates a channel estimation value. Channel estimator 205 outputs the calculated channel estimation value to demodulator and decoder 206.

Demodulator and decoder 206 demodulates the DL control signal input from signal separator 204, using the channel estimation value input from channel estimator 205. For example, demodulator and decoder 206 performs channel compensation (equalization process) for the DL control signal that is a demodulation target, by multiplying the reciprocal of the channel estimation value of the resource to which the demodulation-target DL data signal has been mapped, and demodulates the channel-compensated DL control signal. Demodulator and decoder 206 performs the decoding process (for example, a blind detection process) for the demodulated DL control signal, and identifies the DL control signal destined for the own apparatus. Demodulator and decoder 206 outputs, to signal separator 204, the obtained scheduling information and/or the like included in the DL control signal destined for the own apparatus.

Demodulator and decoder 206 performs a demodulation process and a decoding process for the DL data signal input from signal separator 204, using the channel estimation value input from channel estimator 205.

<Mapping Example of Demodulation RS and DL Control Signal>

Next, the mapping configuration of the demodulation RS and the DL control signal is described in detail.

Figure 3:
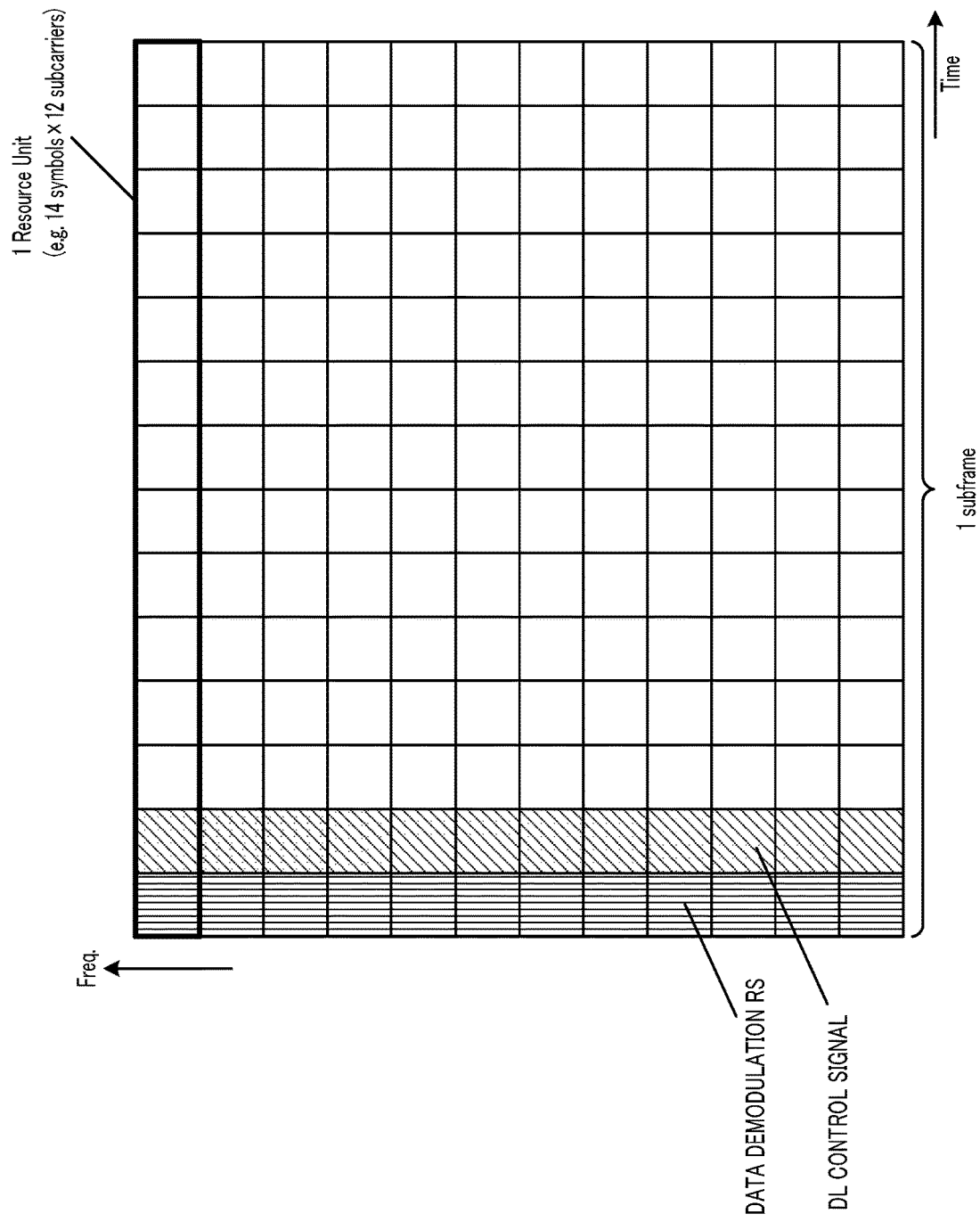
FIG. 3 illustrates a mapping example according to Embodiment 1.

FIG. 3 illustrates a mapping example of the demodulation RS and the DL control signal according to Embodiment 1.

In FIG. 3, the resource unit (also called a resource block, a resource block pair and/or the like) serving as a unit of resource assignment is defined by 168 Resource Elements (REs) including 14 symbols and 12 subcarriers. Each block illustrated in FIG. 3 represents one symbol in the time domain and represents 12 subcarriers in the frequency domain, and corresponds to a resource of 12 REs. In other words, in FIG. 3, 14 blocks that are continuous in the temporal direction and correspond to 14 symbols correspond to one resource unit, and a resource corresponding to 12 resource units is illustrated. One RE is a radio resource domain defined by one symbol and one subcarrier. In FIG. 3, one subframe includes 14 symbols.

In the following description, the demodulation RS for demodulating the DL data signal is called "data demodulation RS."

In FIG. 3, among data demodulation RSs mapped to one or more symbols in one subframe, only data demodulation RSs mapped to symbols that coincide or precede symbols to which the DL control signal is mapped are illustrated. In other words, in FIG. 3, even in a case where the data demodulation RS resides after the DL control signal (on and after the third symbol), the data demodulation RS is not illustrated. In FIG. 3, the DL data signal mapped to the subframe is not illustrated.

Mapping of the data demodulation RS, the DL control signal and/or the like to each RE in each block (the resource of 1 symbol×12 subcarriers (12 REs)) illustrated in FIG. 3 is not limited to specific mapping. Here, the description thereof is omitted.

The data demodulation RS and the DL control signal are mapped to at least one or more forward symbols among multiple symbols in the subframe. For example, as illustrated in FIG. 3, the data demodulation RS is mapped to the first symbol (beginning symbol) in the subframe. The DL control signal is mapped to the second symbol in the subframe. In other words, the DL control signal is mapped to the symbol next to the data demodulation RS mapped to the symbol (the beginning symbol in FIG. 3) at the earliest timing in the subframe.

User terminal 20 (demodulator and decoder 206) demodulates the DL control signal using the channel estimation value calculated from the demodulation RS mapped to the symbols that coincide or precede the symbols to which the DL control signal is mapped in each subframe.

Here, in a case where the DL control signal is pre-coded in radio base station 10, if the port number of the antenna port used for transmitting the DL control signal is identical to any of the port numbers of the antenna ports used for transmitting the data demodulation RS (that is, the DL data signal), user terminal 20 demodulates the DL control signal using the channel estimation value calculated from the data demodulation RS having the same port number as the DL control signal has. In other words, user terminal 20 (demodulator and decoder 206) demodulates the DL control signal using the channel estimation value calculated from the data demodulation RS mapped to the beginning symbol in the subframe.

On the contrary, if the port number of the DL control signal is different from each port number of the data demodulation RS (that is, the DL data signal), user terminal 20 cannot demodulate the DL control signal using the channel estimation value calculated from the data demodulation RS. In this case, radio base station 10 maps the demodulation RS for demodulating the DL control signal (that is, the reference signal transmitted using the same port number as that of the DL control signal; hereinafter called "control signal demodulation RS") to the symbol identical to that of the DL control signal (or the symbols therebefore) (not illustrated), and user terminal 20 demodulates the DL control signal using the channel estimation value calculated using the control signal demodulation RS.

In other words, if the port numbers used for transmitting the DL control signal and the data demodulation RS are identical, user terminal 20 can demodulate the DL control signal utilizing the data demodulation RS. Consequently, the control signal demodulation RS can be eliminated or reduced.

The method of issuing an indication about reduction in control signal demodulation RS may be predefined by a predetermined reducing method. The indication may be an indication via higher layer (RRC, MAC and/or the like) signaling or physical layer signaling. The method may be performed through implicit determination by user terminal 20.

Advantageous Effects of Embodiment 1

As described above, user terminal 20 utilizes the data demodulation RS as the DL control signal demodulation RS, thereby negating the need of the control signal demodulation RS. Consequently, in a case where the DL control signal is pre-coded, increase in the resource to which the demodulation RS is mapped can be prevented. This processing can prevent the resource utilization efficiency from reducing, even in the case where the DL control signal is pre-coded. The negation of the need of the control signal demodulation RS can prevent increase in signaling overhead for the indication about mapping and/or the like of the control signal demodulation RS.

In a case where the control signal demodulation RS is not eliminated or reduced, user terminal 20 performs channel estimation using both the data demodulation RS and the control signal demodulation RS, thereby allowing the channel estimation accuracy to be improved.

Both the demodulation RSs (the data demodulation RS and the control signal demodulation RS) and the DL control signal are mapped to the forward symbols in the subframe (the first and second symbols in FIG. 3). Consequently, user terminal 20 can start the channel estimation and the signal demodulation and decoding processes at the timing when the symbol is received at the forward position in each subframe, without waiting for receipt of the subframe. According to this processing, in comparison with a case where the demodulation RS is mapped rearward in the subframe, reduction in the processing time required for the channel estimation and the signal demodulation and decoding processes in the subframe (that is, low latency) can be achieved.

Furthermore, the DL control signal is mapped to the next symbol adjacent to the symbol (the beginning symbol in FIG. 3) to which the data demodulation RS is mapped, or to symbols thereafter. In other words, user terminal 20 sequentially receives the data demodulation RS and the DL control signal in each subframe. This processing allows user terminal 20 to start the channel estimation process at timing which is before the DL control signal receiving timing and at which the data demodulation RS is received. Upon receipt of the DL control signal, user terminal 20 can perform the demodulation process using the channel estimation value having already been calculated. Consequently, the DL control signal demodulation process can be completed earlier.

As described above, according to Embodiment 1, the DL control signal is mapped to the adjacent symbol subsequent to the symbol to which the data demodulation RS is mapped, or to symbols thereafter. According to this processing, even in the case where the DL control signal is pre-coded, the beam forming gain can be obtained while preventing signaling overhead and latency time from increasing. Consequently, the reception quality of the DL control signal can be improved even specifically in a high frequency band.

Modification Example 1 of Embodiment 1

FIG. 3 illustrates the case where the data demodulation RS and the DL control signal are mapped to the identical bandwidth and the identical band. However, the data demodulation RS and the DL control signal may be mapped to different bandwidths or different bands.

Figure 4:
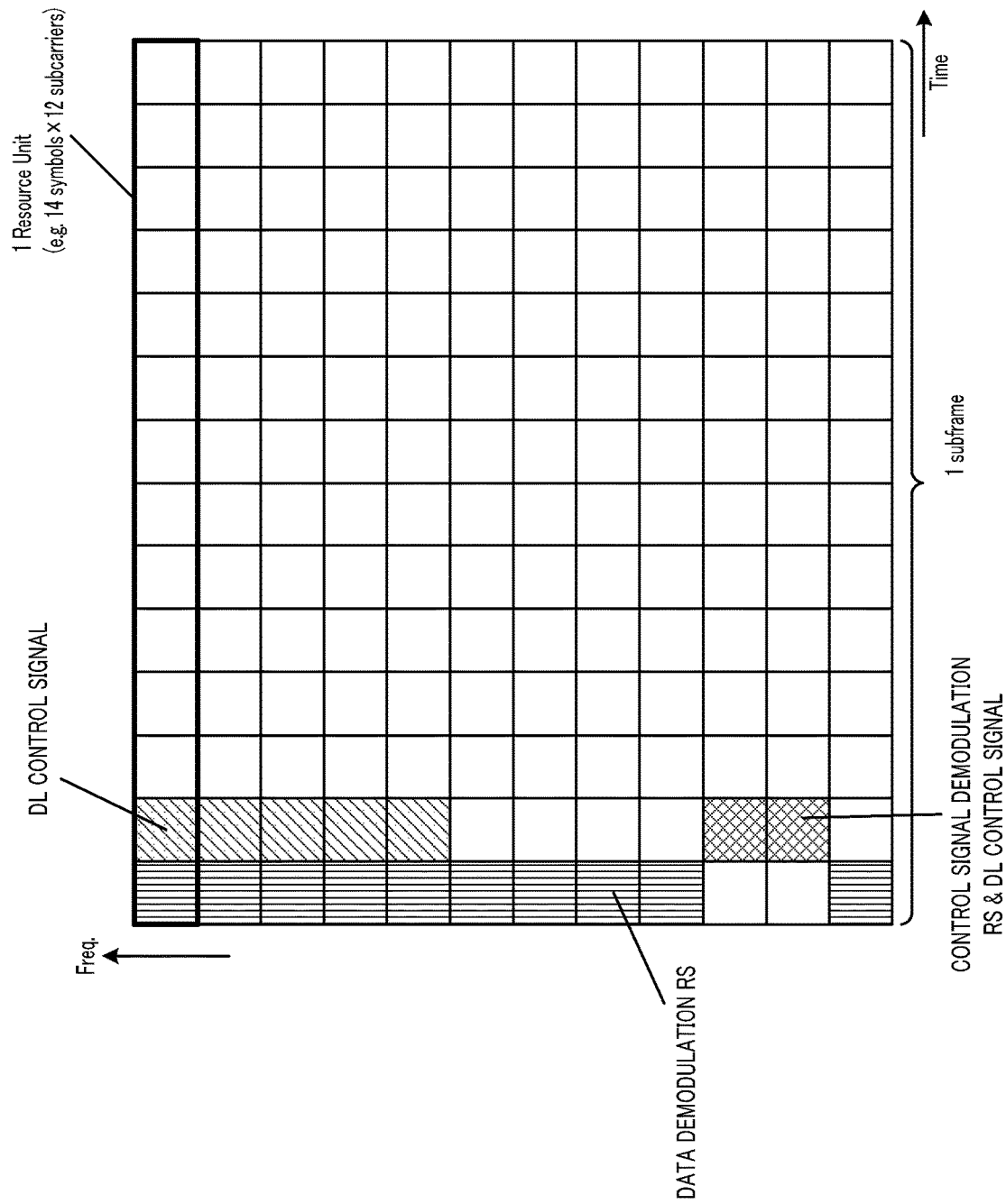
FIG. 4 illustrates a mapping example according to Modification Example 1 of Embodiment 1.

FIG. 4 illustrates a mapping example of the data demodulation RS and the DL control signal according to Modification Example 1 of Embodiment 1.

As illustrated in FIG. 4, the data demodulation RS is mapped to 10 resource units among 12 resource units at the first symbol in the subframe. Meanwhile, the DL control signal is mapped to 7 resource units among 12 resource units at the second symbol in the subframe. In other words, the data demodulation RS and the DL control signal have different bandwidths.

In FIG. 4, in a band (the first to fifth resource units from the top) where both the data demodulation RS and the DL control signal are mapped, the data demodulation RS can be utilized for demodulating the DL control signal in a case where the data demodulation RS and the DL control signal have the identical port number. Accordingly, only the DL control signal is mapped to the second symbol in the subframe.

Meanwhile, in FIG. 4, in a band (the second and third resource units from the bottom) where the data demodulation RS is not mapped, the DL control signal and the control signal demodulation RS are mapped, in a multiplexed manner, to the resource where the DL control signal is mapped.

User terminal 20 can demodulate the DL control signal in the band where no data demodulation RS is mapped, using the channel estimation value calculated from the data demodulation RS mapped to another band (for example, the adjacent band) or a value corresponding to the channel estimation value in the band calculated using an estimation value in another band. In this case, the control signal demodulation RS is not required to be mapped to the resource where the DL control signal is mapped.

As described above, the bandwidths or bands where the data demodulation RS and the DL control signal are mapped are configured to be different from each other, which can improve the design flexibility of mapping each signal and reduce the overhead caused by mapping unnecessary (or excessive) signals.

Modification Example 2 of Embodiment 1

The data demodulation RS and the DL control signal may be mapped according to the resource assigned to user terminal 20 (sometimes simply called a user), or be mapped independently of the resource assigned to user terminal 20.

Figure 5:
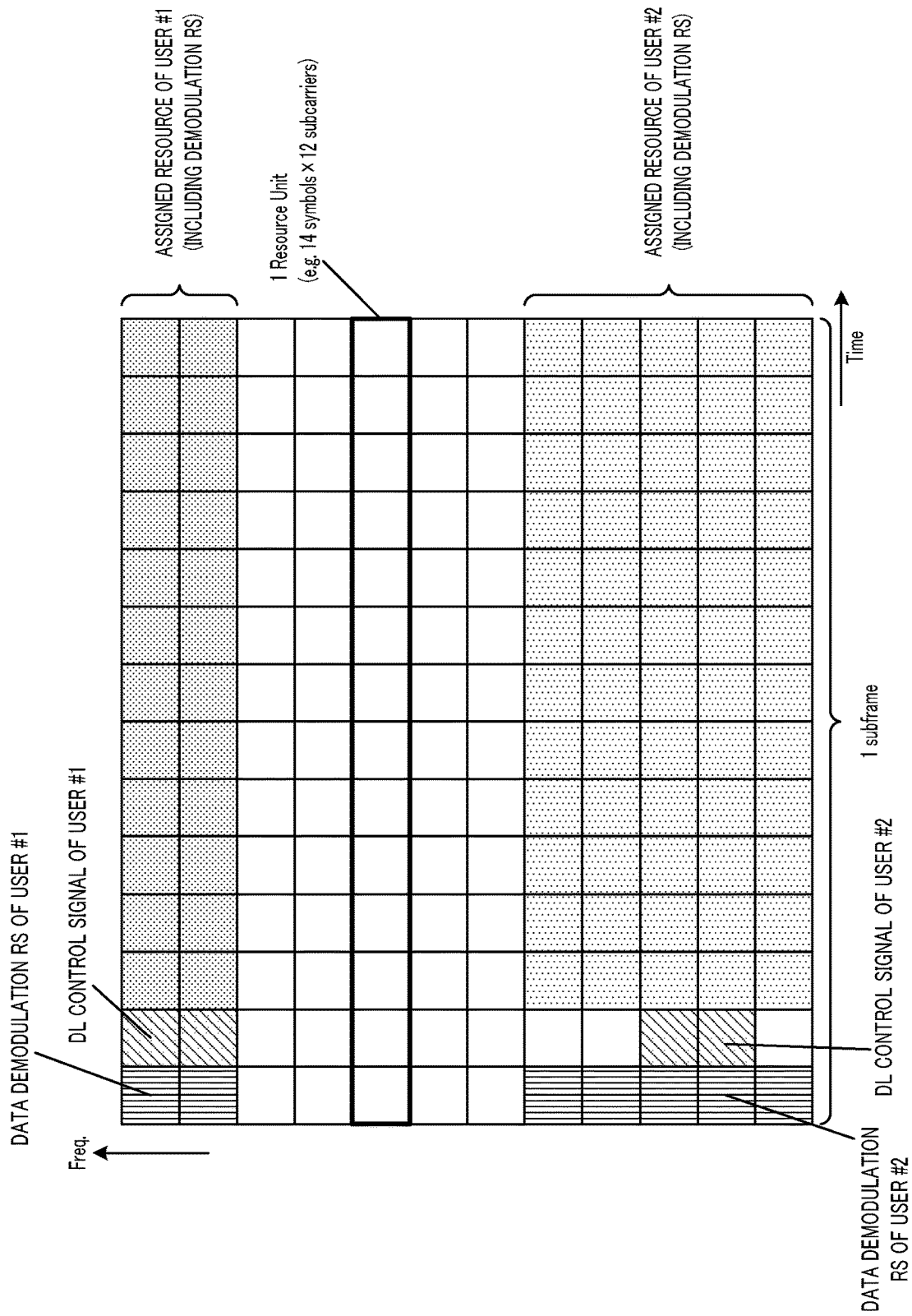
FIG. 5 illustrates a mapping example according to Modification Example 2 of Embodiment 1.
Figure 6:
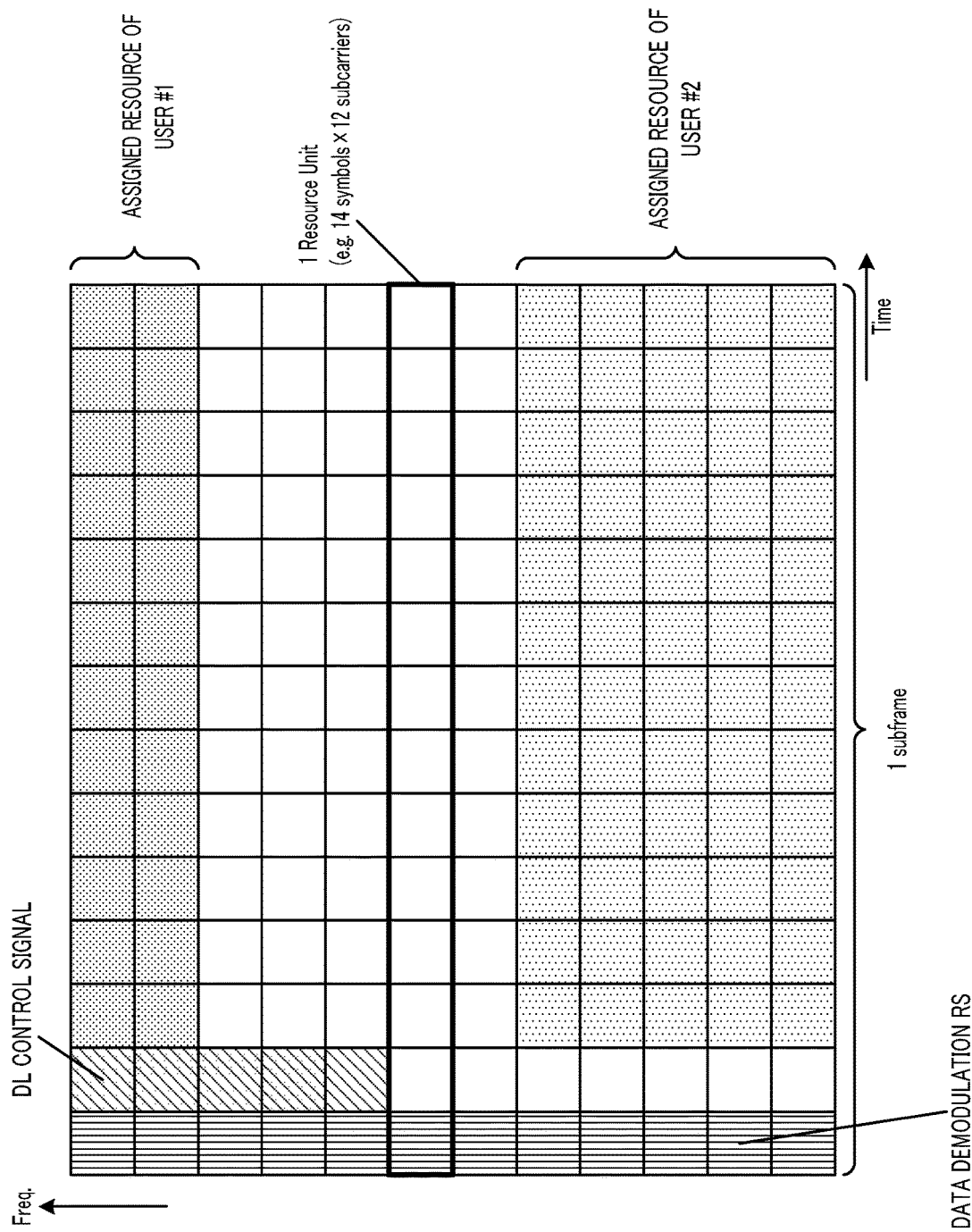
FIG. 6 illustrates a mapping example according to Modification Example 2 of Embodiment 1.

FIGS. 5 and 6 illustrate a mapping example of the data demodulation RS and the DL control signal according to Modification Example 2 of Embodiment 1.

In FIGS. 5 and 6, two resource units (the first and second resource units from the top) are assigned to the DL data signal (for example, PDSCH) for user #1. Five resource units (the first to fifth resource units from the bottom) are assigned to the DL data signal (for example, PDSCH) for user #2.

In FIG. 5, the data demodulation RS and the DL control signal are mapped to the band identical to that of the resource assigned to user terminal 20.

Specifically, as illustrated in FIG. 5, the demodulation RSs for user #1 and user #2 are mapped to bands identical to those of resources assigned to the DL data signals destined for the respective users.

As illustrated in FIG. 5, the DL control signals for user #1 and user #2 are mapped to bands identical to those of resources assigned to the DL data signals destined for the respective users. However, while the DL control signal for user #1 is mapped to the resource (two resource units) identical to the assigned resource, the DL control signal for user #2 is mapped to a part (two resource units) of the assigned resource (five resource units).

The mapping illustrated in FIG. 5 can simplify the resource assignment (scheduling) to the DL data signal, the data demodulation RS and the DL control signal for each user terminal 20. The pre-coding (identical to that for the DL data signal) for this user terminal 20 can be applied to the DL control signal. Consequently, this user terminal 20 can effectively enjoy the pre-coding gain for the DL control signal.

Meanwhile, in FIG. 6, the data demodulation RS and the DL control signal are mapped independently of the resource assigned to user terminal 20.

Specifically, as illustrated in FIG. 6, the demodulation RS is mapped to all the bands, and the DL control signal is mapped to five resource units (the first to fifth resource units from the top).

According to the mapping illustrated in FIG. 6, the data demodulation RS and the DL control signal can be mapped independently of the resource assigned the DL data signal. Consequently, the design flexibility of mapping each signal can be improved, and the overhead caused by mapping unnecessary (or excessive) signals can be reduced.

Modification Example 3 of Embodiment 1

The number of layers of the DL control signal may be identical to or different from the number of layers of the demodulation RS (that is, the number of layers of the DL data signal).

Figure 7:
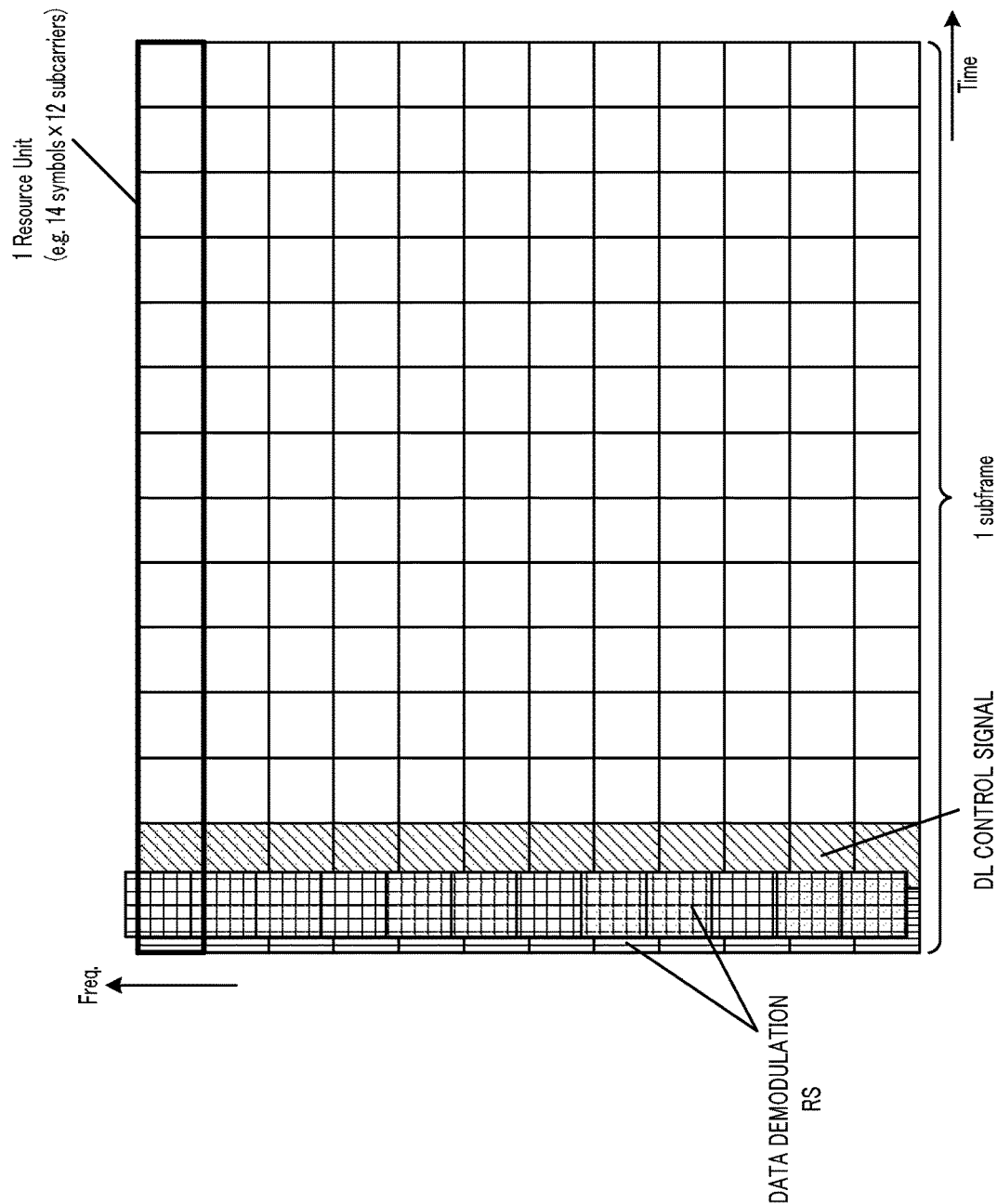
FIG. 7 illustrates a mapping example according to Modification Example 3 of Embodiment 1.
Figure 8:
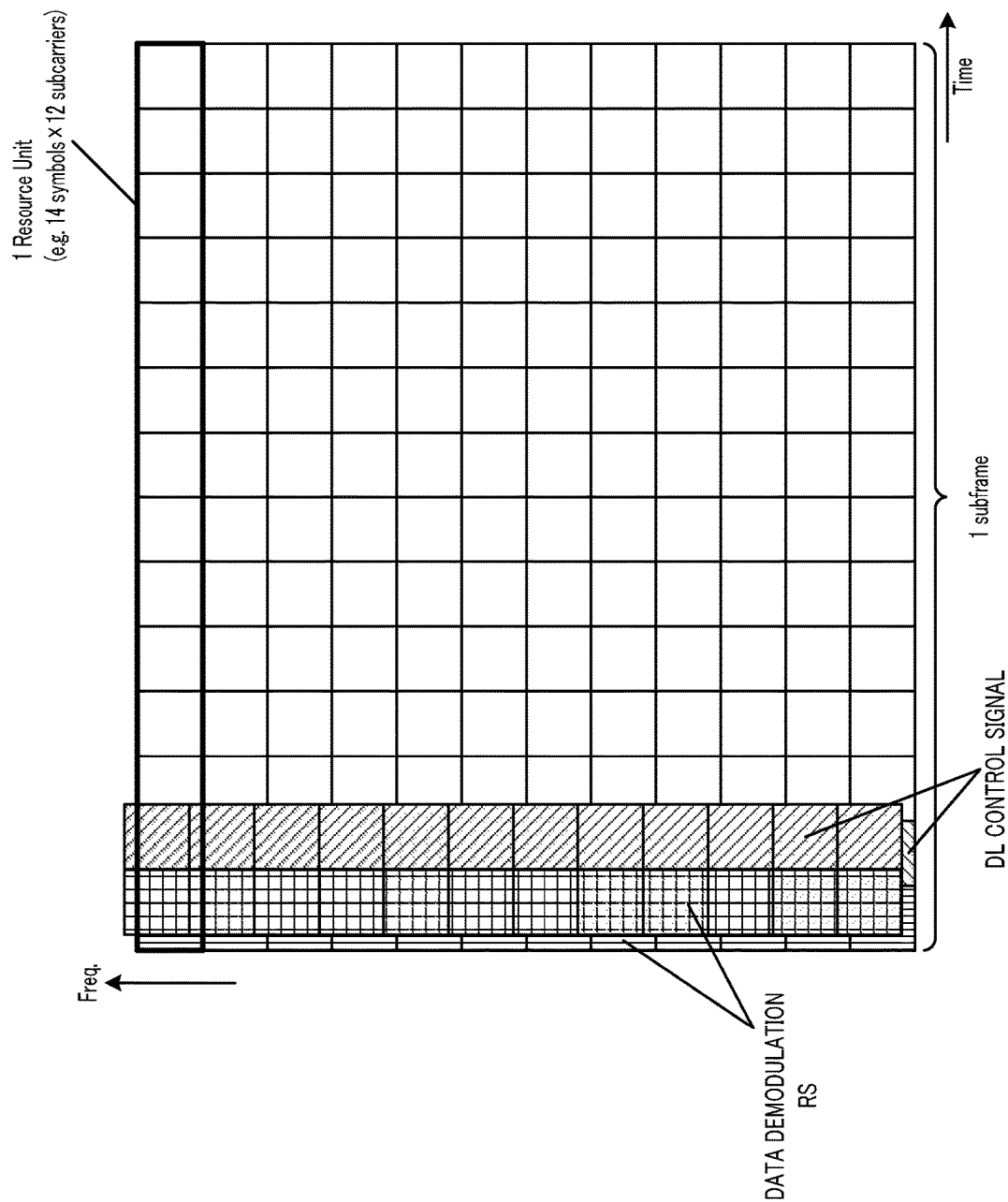
FIG. 8 illustrates a mapping example according to Modification Example 3 of Embodiment 1.

FIGS. 7 and 8 illustrate a mapping example of the data demodulation RS and the DL control signal according to Modification Example 3 of Embodiment 1.

In FIGS. 7 and 8, according to one example of a case where the DL data signal (data demodulation RS) is multiplexed on multiple layers (hereinafter called multiple-layer multiplexing), the number of layers of the DL data signal (demodulation RS) is two.

In FIG. 7, according to an example of a case where the DL control signal is transmitted using only one layer (hereinafter called one-layer transmission), the number of layers of the DL control signal is one. In FIG. 8, the number of layers of the DL control signal is two, which are the same as the number of layers of the DL data signal.

In FIGS. 7 and 8, in a case where the port number of the antenna port used to transmit the DL control signal is the same as that of any data demodulation RS (DL data signal), the data demodulation RS can be utilized also for demodulating the DL control signal. On the contrary, in a case where the port number of the antenna port used to transmit the DL control signal is different from each data demodulation RS (DL data signal), the control signal demodulation RS is multiplexed (not illustrated).

Here, the one-layer transmission improves the reception quality even though the transmission rate of the DL control signal is reduced in comparison with the multiple-layer multiplexing. In other words, the multiple-layer multiplexing reduces the reception quality even though the transmission rate of the DL control signal is increased in comparison with the one-layer transmission.

Typically, the DL control signal is information that is more important than the DL data signal.

Accordingly, for example, the number of layers of the DL control signal may be determined according to whether the reception quality required for the DL control signal is satisfied or not. This processing prevents signaling overhead and latency time from increasing while maintaining the reception quality required for the DL control signal, and can improve the reception quality of the DL control signal.

Modification Example 4 of Embodiment 1

The mapping pattern of the demodulation RS and the DL control signal (mapping configuration) may be different on a cell-by-cell basis (for example, radio base station 10 or the component carrier (CC)).

Figure 9B:
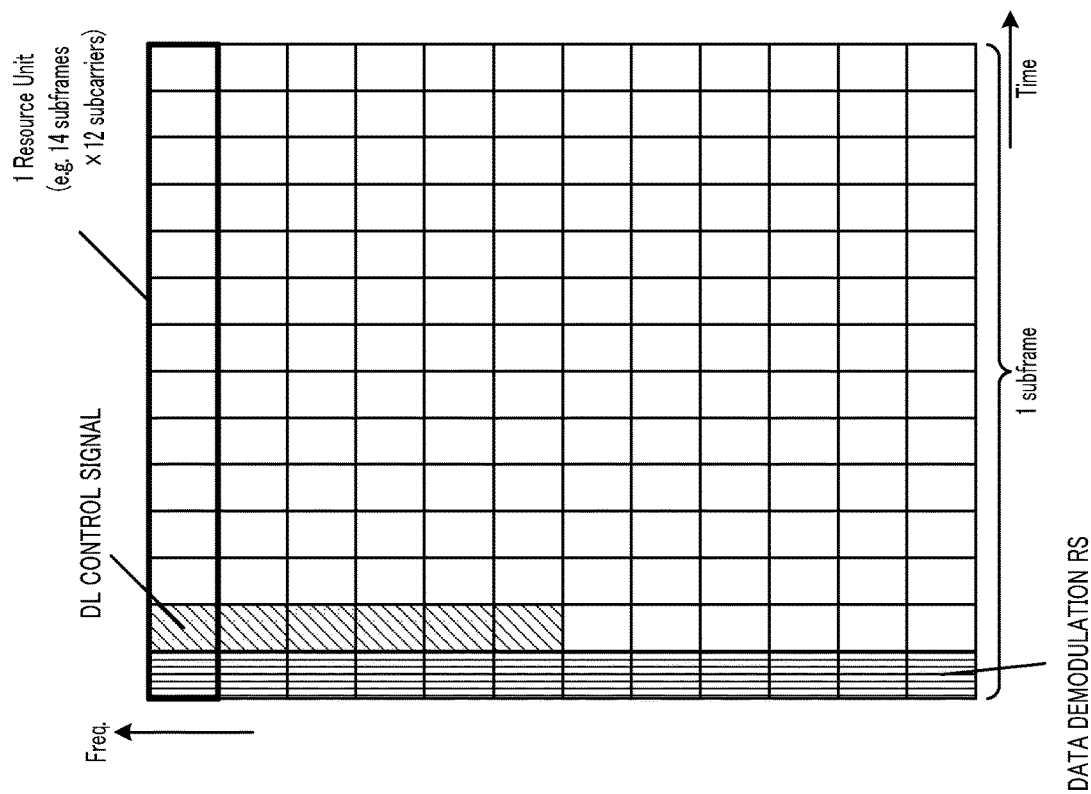
FIG. 9B illustrates a mapping example according to Modification Example 4 of Embodiment 1.
Figure 9A:
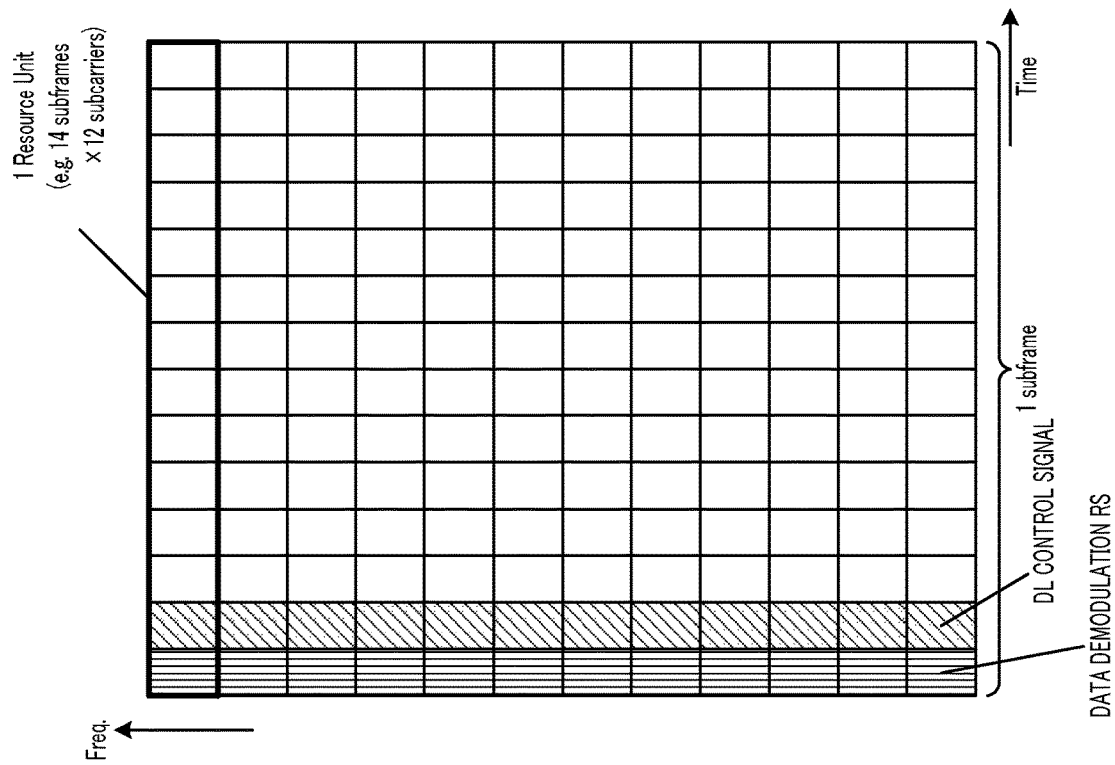
FIG. 9A illustrates a mapping example according to Modification Example 4 of Embodiment 1.

FIGS. 9A and 9B illustrate a mapping example of the data demodulation RS and the DL control signal according to Modification Example 4 of Embodiment 1. In FIGS. 9A and 9B, the mapping patterns of the DL control signals are different from each other. For example, in cell #1 (or radio base station #1, CC #1), the mapping pattern illustrated in FIG. 9A may be set. In cell #2 (or radio base station #2, CC #2), the mapping pattern illustrated in FIG. 9B may be set.

FIGS. 9A and 9B illustrate, as an example, a case where the mapping patterns of the demodulation RSs are the same and the mapping patterns of the DL control signals are different between cells. However, the mapping patterns are not limited to those illustrated in FIGS. 9A and 9B. The mapping patterns of both the demodulation RSs and the DL control signals may be different between cells. Only the mapping patterns of the demodulation RSs may be different between cells.

In this manner, the different configurations of the demodulation RSs and the DL control signals between cells can configure the mapping pattern in conformity with the communication environment on a cell-by-cell basis, improve the design flexibility of mapping each signal, and reduce the overhead caused by mapping unnecessary (excessive) signals.

Modification Example 5 of Embodiment 1

In Modification Example 5 of Embodiment 1, a case is described where the mapping pattern of the DL control signal (or the transmission bandwidth of the DL control signal) is configured in conformity with the amount of resources (capacity) assigned to the DL control signal.

FIGS. 10A to 10E illustrate a mapping example of the data demodulation RS and the DL control signal according to Modification Example 5 of Embodiment 1. In FIGS. 10A to 10E, the data demodulation RS is mapped to all the bands at the beginning symbol in the subframe.

Figure 10B:
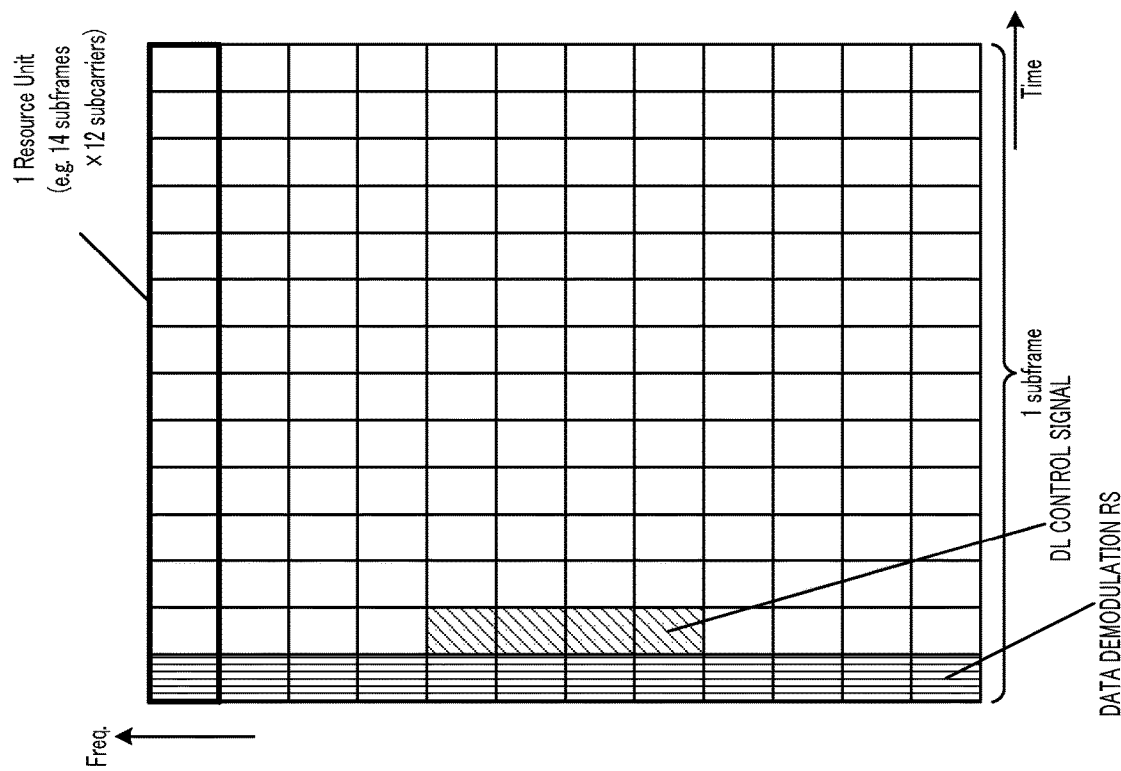
FIG. 10B illustrates a mapping example according to Modification Example 5 of Embodiment 1.
Figure 10A:
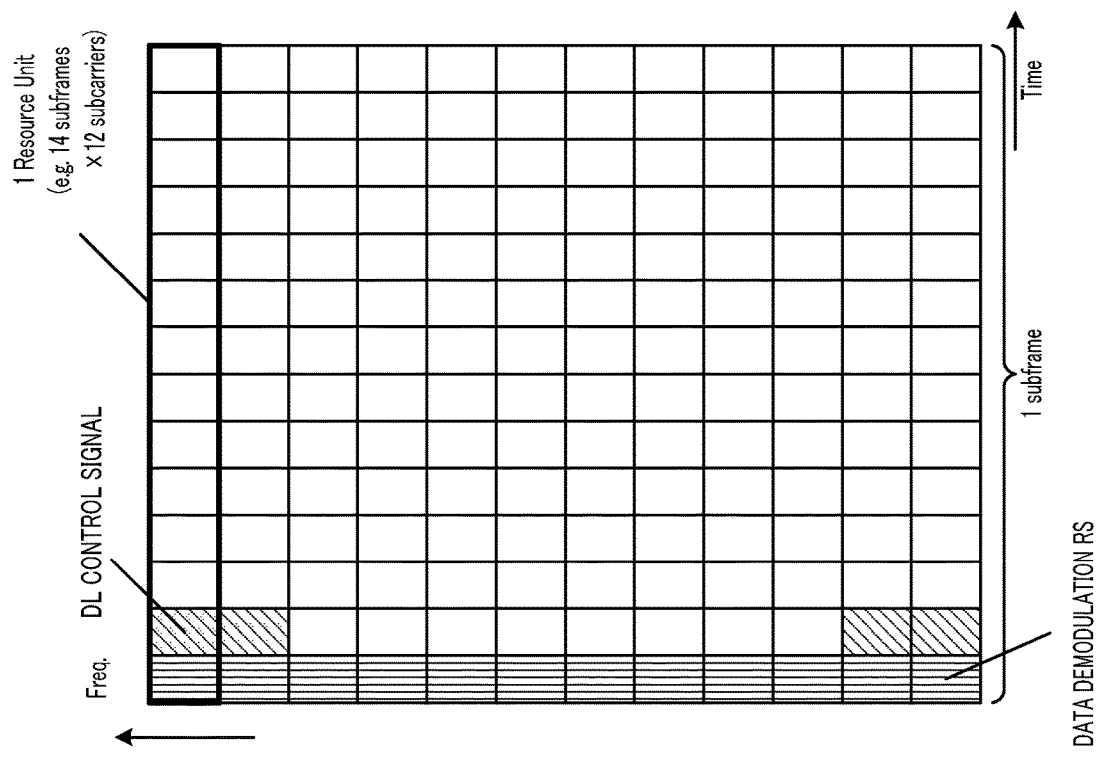
FIG. 10A illustrates a mapping example according to Modification Example 5 of Embodiment 1.

For example, a mapping pattern illustrated in FIG. 10A is a pattern example where the DL control signal is locally mapped to four resource units that are a relatively small amount of assigned resource (small capacity local mapping). A mapping pattern illustrated in FIG. 10B is a pattern example where the DL control signal is mapped in a distributed manner to four resource units that are a relatively small amount of assigned resource (small capacity distributed mapping).

Figure 10D:
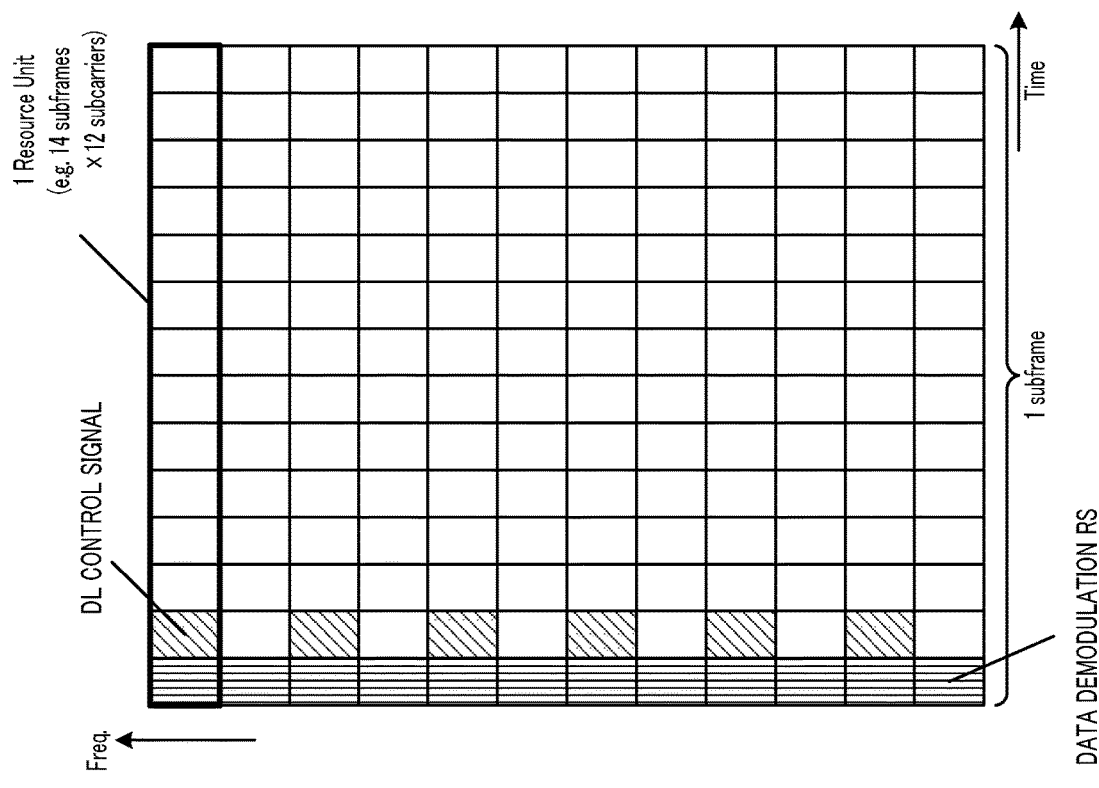
FIG. 10D illustrates a mapping example according to Modification Example 5 of Embodiment 1.
Figure 10C:
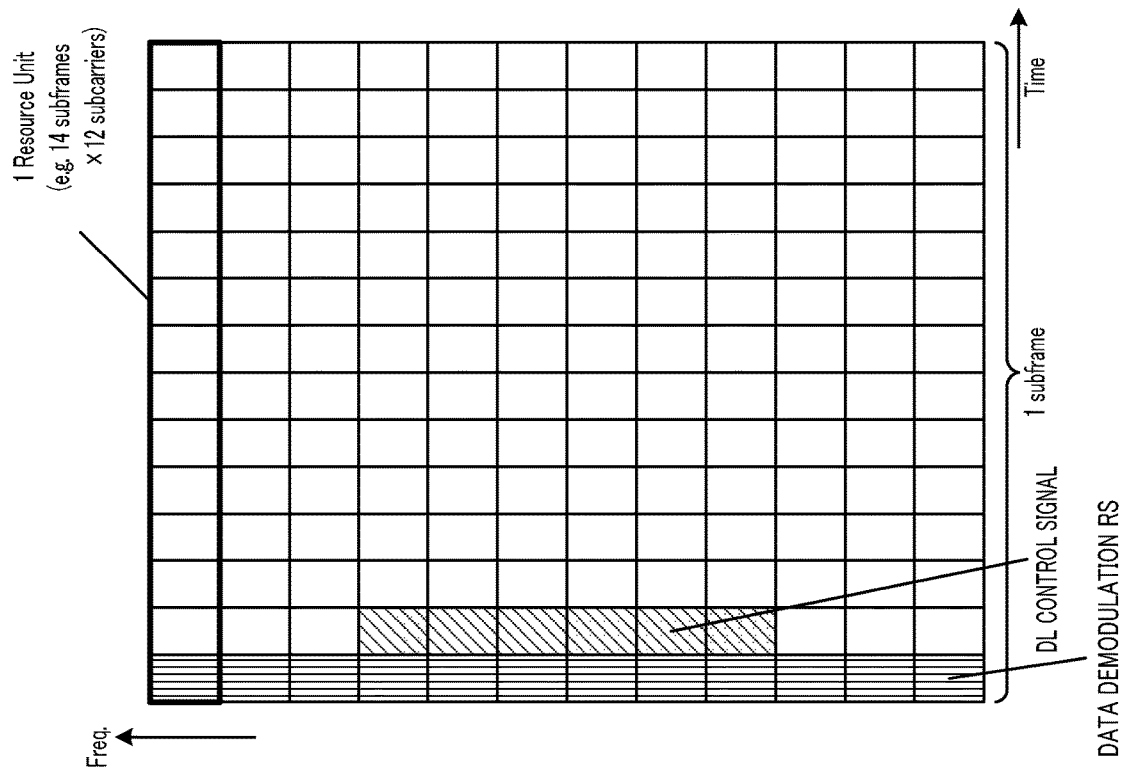
FIG. 10C illustrates a mapping example according to Modification Example 5 of Embodiment 1.

For example, a mapping pattern illustrated in FIG. 10C is a pattern example where the DL control signal is locally mapped to six resource units that are a medium amount of assigned resource (medium capacity local mapping). A mapping pattern illustrated in FIG. 10D is a pattern where the DL control signal is mapped in a distributed manner to six resource units that are a medium amount of assigned resource (medium capacity distributed mapping).

Figure 10E:
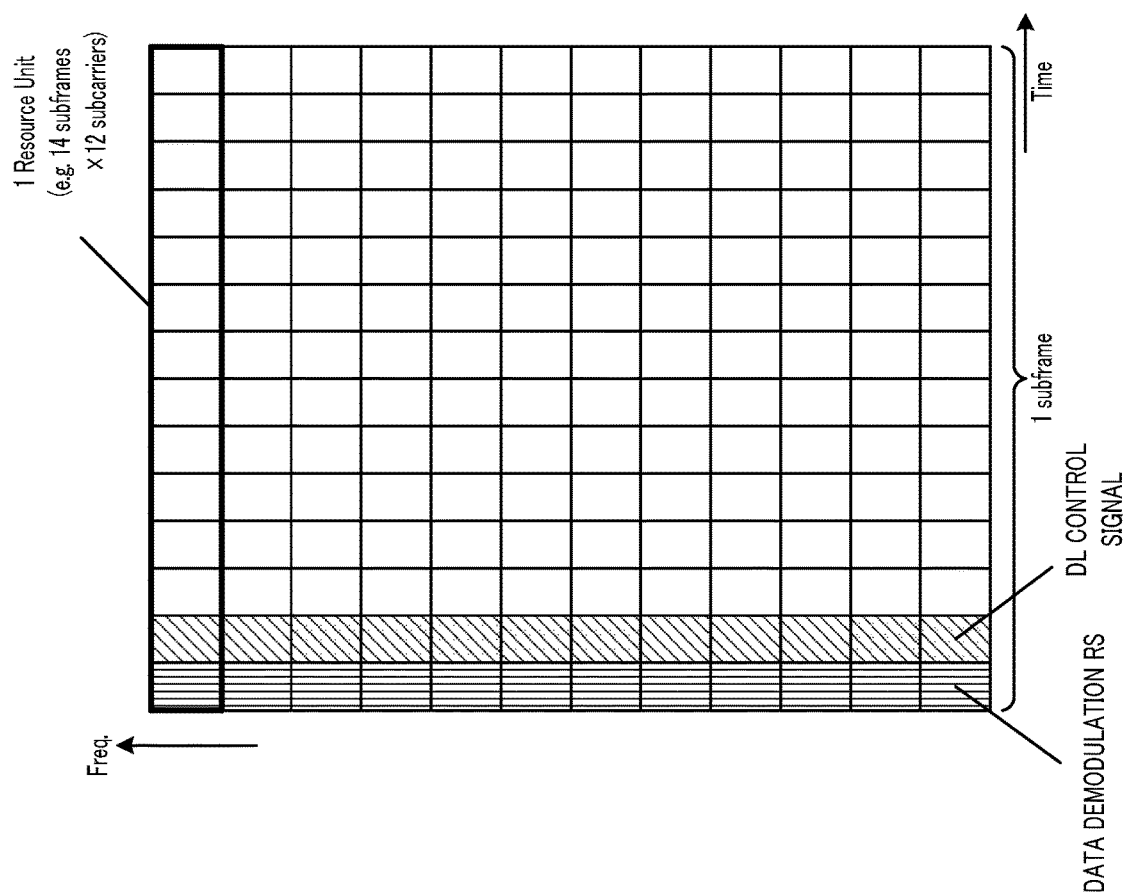
FIG. 10E illustrates a mapping example according to Modification Example 5 of Embodiment 1.

A mapping pattern illustrated in FIG. 10E is a pattern where the DL control signal is mapped to 12 resource units that are a relatively large amount of assigned resource (large capacity).

The number (bandwidth) of resource units where the DL control signal is mapped, and the mapping position are not limited to the mapping patterns illustrated in FIGS. 10A to 10E.

Radio base station 10 and user terminal 20 may predefine multiple mapping patterns as in FIGS. 10A to 10E. In this case, user terminal 20 may identify the mapping position of the DL control signal destined for the own apparatus, through the blind detection process.

Specifically, first, as illustrated in FIGS. 10A to 10E, user terminal 20 calculates the channel estimation value using the demodulation RS mapped to the beginning symbol in the subframe. Next, user terminal 20 performs a blind detection process for an area (mapping candidate) where the DL control signal can be mapped, in each of the mapping patterns, using the channel estimation value, thereby identifying the DL control signal destined for the own apparatus. User terminal 20 then receives the DL data signal according to the scheduling information (for example, the assigned resource) included in the identified DL control signal.

In this manner, the blind detection by user terminal 20 can reduce signaling for indication about the mapping pattern of the DL control signal to user terminal 20. The blind detection can also reduce the time for detecting the DL control signal in user terminal 20.

Modification Examples 1 to 5 of Embodiment 1 have thus been described above.

The mapping patterns illustrated in FIGS. 3 to 10E with reference to which Embodiment 1 has been described are only examples. The pattern is not limited to those. FIGS. 3 to 10E each illustrate, as an example, the case where the demodulation RS is mapped to the beginning symbol in the subframe. However, the symbol to which the demodulation RS is mapped is not limited to the beginning symbol. The symbol may be any forward symbol in the subframe (for example, any of a predetermined number of beginning symbols and/or the like) that can achieve low latency. In Embodiment 1, the number of symbols where the demodulation RS is mapped is not limited to one. Mapping may be made to two or more symbols.

The mapping patterns (FIGS. 3 to 10E) described in Embodiment 1 may be configured in each subframe, or configured in some subframes.

Embodiment 2

In Embodiment 1, the case has been described where the DL control signal is mapped to the symbol next to the demodulation RS mapped forward in the subframe. Meanwhile, in Embodiment 2, a case is described where the DL control signal is mapped to the symbol identical to that of the demodulation RS mapped forward in the subframe.

A radio base station and a user terminal according to Embodiment 2 have basic configurations common to those of radio base station 10 and user terminal 20 according to Embodiment 1. Consequently, the description is made with reference to FIGS. 1 and 2.

Hereinafter, the mapping configuration of the demodulation RS and the DL control signal according to Embodiment 2 is described in detail.

Figure 11:
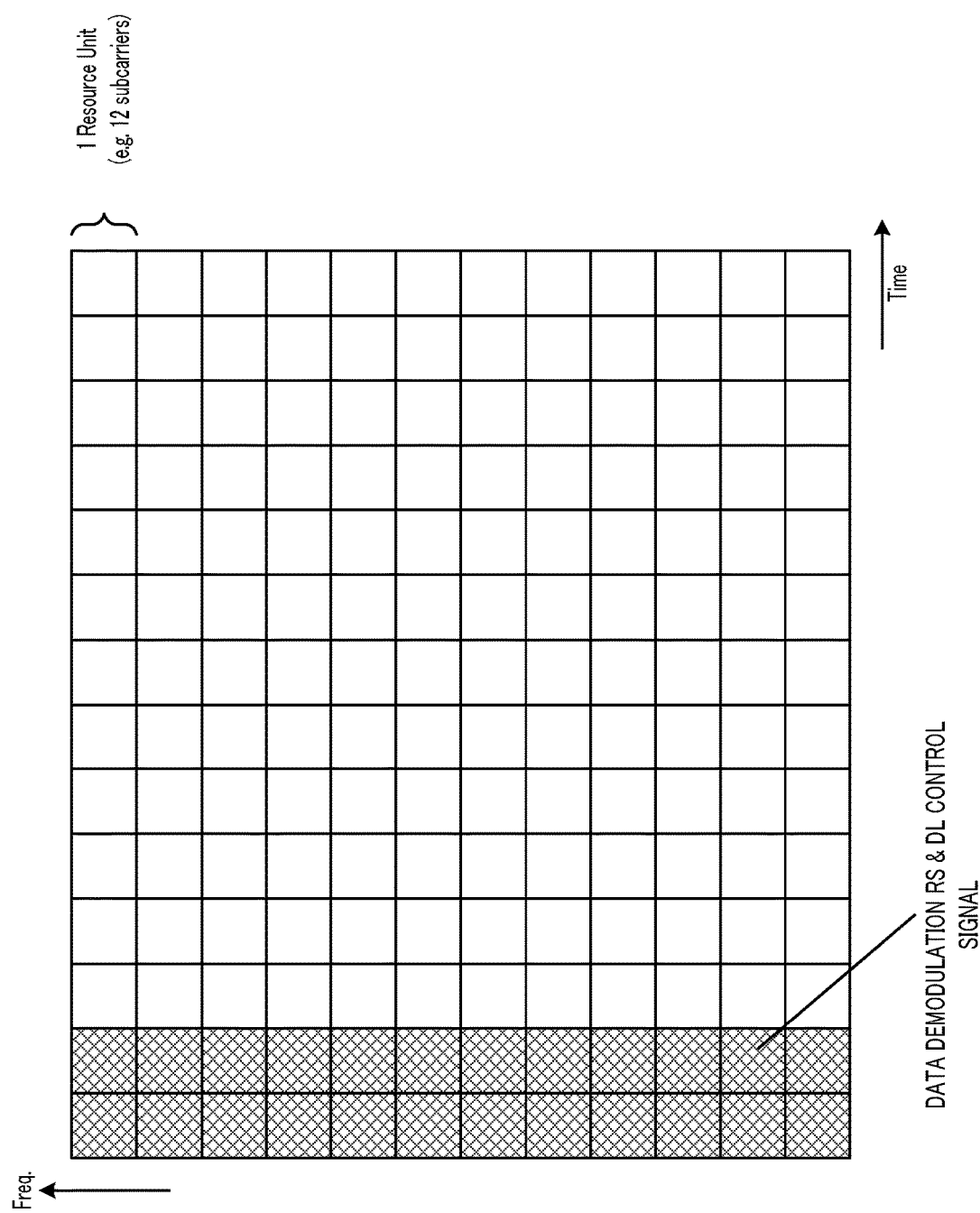
FIG. 11 illustrates a mapping example according to Embodiment 2.

FIG. 11 illustrates a mapping example of the demodulation RS and the DL control signal according to Embodiment 2.

In FIG. 11, as with Embodiment 1 (FIG. 3), the resource unit, which serves as a resource assignment unit, is defined by 168 REs including 14 symbols and 12 subcarriers. Each block illustrated in FIG. 11 corresponds to a resource having one symbol×12 subcarriers (that is, 12 REs). In other words, in FIG. 11, 14 blocks that are continuous in the temporal direction and correspond to 14 symbols correspond to one resource unit, and a resource corresponding to 12 resource units is illustrated. In FIG. 11, one subframe includes 14 symbols.

In FIG. 11, among data demodulation RSs mapped to each symbol in one subframe, only data demodulation RSs mapped to symbols that coincide or precede symbols to which the DL control signal is mapped are illustrated. In other words, in FIG. 11, even in a case where the data demodulation RS resides after the DL control signal (on and after the third symbol), the data demodulation RS is not illustrated. In FIG. 11, the DL data signal mapped to the subframe is not illustrated.

Mapping of the data demodulation RS, the DL control signal and/or the like to each RE in each block (the resource of 1 symbol×12 subcarriers (12 REs)) illustrated in FIG. 11 is not limited to a specific method. Here, the description thereof is omitted.

The data demodulation RS and the DL control signal are mapped to at least one or more forward symbols among multiple symbols in the subframe. For example, as illustrated in FIG. 11, both the data demodulation RS and the DL control signal are mapped to the first symbol (beginning symbol) and the second symbol in the subframe. In other words, the DL control signal is mapped to the symbols identical to the symbols (the two symbols from the beginning in FIG. 11) which reside forward in the subframe and to which the data demodulation RS is mapped.

User terminal 20 (demodulator and decoder 206) demodulates the DL control signal using the channel estimation value calculated from the demodulation RS mapped to the symbols identical to the symbols to which the DL control signal is mapped in each subframe.

Here, in a case where the DL control signal is pre-coded in radio base station 10, if the port number of the antenna port used for transmitting the DL control signal is identical to any of the port numbers of the antenna ports used for transmitting the data demodulation RS (that is, the DL data signal), user terminal 20 demodulates the DL control signal using the channel estimation value calculated from the data demodulation RS having the same port number as the DL control signal has. In other words, user terminal 20 (demodulator and decoder 206) demodulates the DL control signal using the channel estimation value calculated from the data demodulation RS mapped to any of the beginning two symbol.

On the contrary, if the port number of the DL control signal is different from each port number of the data demodulation RS (that is, the DL data signal), user terminal 20 cannot demodulate the DL control signal using the channel estimation value calculated from the data demodulation RS. In this case, radio base station 10 maps the control signal demodulation RS to the symbol identical to that of the DL control signal (or symbols therebefore) (not illustrated), and user terminal 20 demodulates the DL control signal using the channel estimation value calculated using the control signal demodulation RS.

In other words, if the port numbers used for transmitting the DL control signal and the data demodulation RS are identical, user terminal 20 can demodulate the DL control signal utilizing the data demodulation RS. Consequently, the control signal demodulation RS can be eliminated or reduced.

The method of issuing an indication about reduction in control signal demodulation RS may be predefined by a predetermined reducing method. The indication may be an indication via higher layer (RRC, MAC and/or the like) signaling or physical layer signaling. The method may be performed through implicit determination by user terminal 20.

Advantageous Effects of Embodiment 2

As described above, user terminal 20 utilizes the data demodulation RS as the DL control signal demodulation RS, thereby negating the need of the control signal demodulation RS. Consequently, in a case where the DL control signal is pre-coded, increase in the resource to which the demodulation RS is mapped can be prevented. This processing can prevent the resource utilization efficiency from reducing, even in the case where the DL control signal is pre-coded. Utilization of the data demodulation RS also for demodulating the DL control signal negates the need of the control signal demodulation RS. This negation can prevent increase in signaling overhead for the indication about mapping and/or the like of the control signal demodulation RS.

In a case where the control signal demodulation RS is not eliminated or reduced, user terminal 20 performs channel estimation using both the data demodulation RS and the control signal demodulation RS, thereby allowing the channel estimation accuracy to be improved.

Both the demodulation RSs (the data demodulation RS and the control signal demodulation RS) and the DL control signal are mapped to the forward symbols in the subframe (the first and second symbols in FIG. 11). Consequently, user terminal 20 can start the channel estimation and the signal demodulation without waiting for receipt of the entire subframe. According to this processing, in comparison with a case where the demodulation RS is mapped rearward in the subframe, reduction in the processing time required for the channel estimation and the signal demodulation in the subframe (that is, low latency) can be achieved.

As described above, according to Embodiment 2, the DL control signal is mapped to the symbol identical to the symbol to which the data demodulation RS is mapped. According to this processing, even in the case where the DL control signal is pre-coded, the beam forming gain can be obtained while preventing signaling overhead and latency time from increasing. Consequently, the reception quality of the DL control signal can be improved even specifically in a high frequency band.

In Embodiment 2, the DL control signal is mapped to the symbols identical to the symbols (the two symbols from the beginning in FIG. 11) to which the data demodulation RS is mapped. In Embodiment 2, according to this processing, user terminal 20 can demodulate the DL control signal using the channel estimation value of the data demodulation RS received at the same time as the DL control signal that is a demodulation target, with no consideration for temporal variation in channel. Consequently, according to Embodiment 2, the channel estimation accuracy for the DL control signal can be improved. In comparison with Embodiment 1, the flexibility of the method of mapping the DL control signal and the data demodulation RS is improved. Consequently, the overhead caused by mapping unnecessary (or excessive) signals can be reduced.

FIG. 11 illustrates an example where the demodulation RS is also mapped to the resource (the resource of 1 symbol×12 subcarriers) to which the DL control signal is mapped. However, the configuration is not limited to this example. For example, the demodulation RS may not be necessarily mapped to the resource to which the DL control signal is mapped. In other words, a resource to which only the DL control signal and the demodulation RS are mapped in the temporal direction and the frequency direction, and a resource to which both the DL control signal and the demodulation RS are mapped in a multiplexed manner may reside in a mixed manner. For example, in the temporal direction, the demodulation RS and the DL control signal may be mapped to the first symbol in the subframe in a multiplexed manner, and only the DL control signal may be mapped to the second symbol (not illustrated).

Modification Example 1 of Embodiment 2

FIG. 11 illustrates the case where the data demodulation RS and the DL control signal are mapped to the identical bandwidth and the identical band. However, the data demodulation RS and the DL control signal may be mapped to different bandwidths or different bands.

Figure 12:
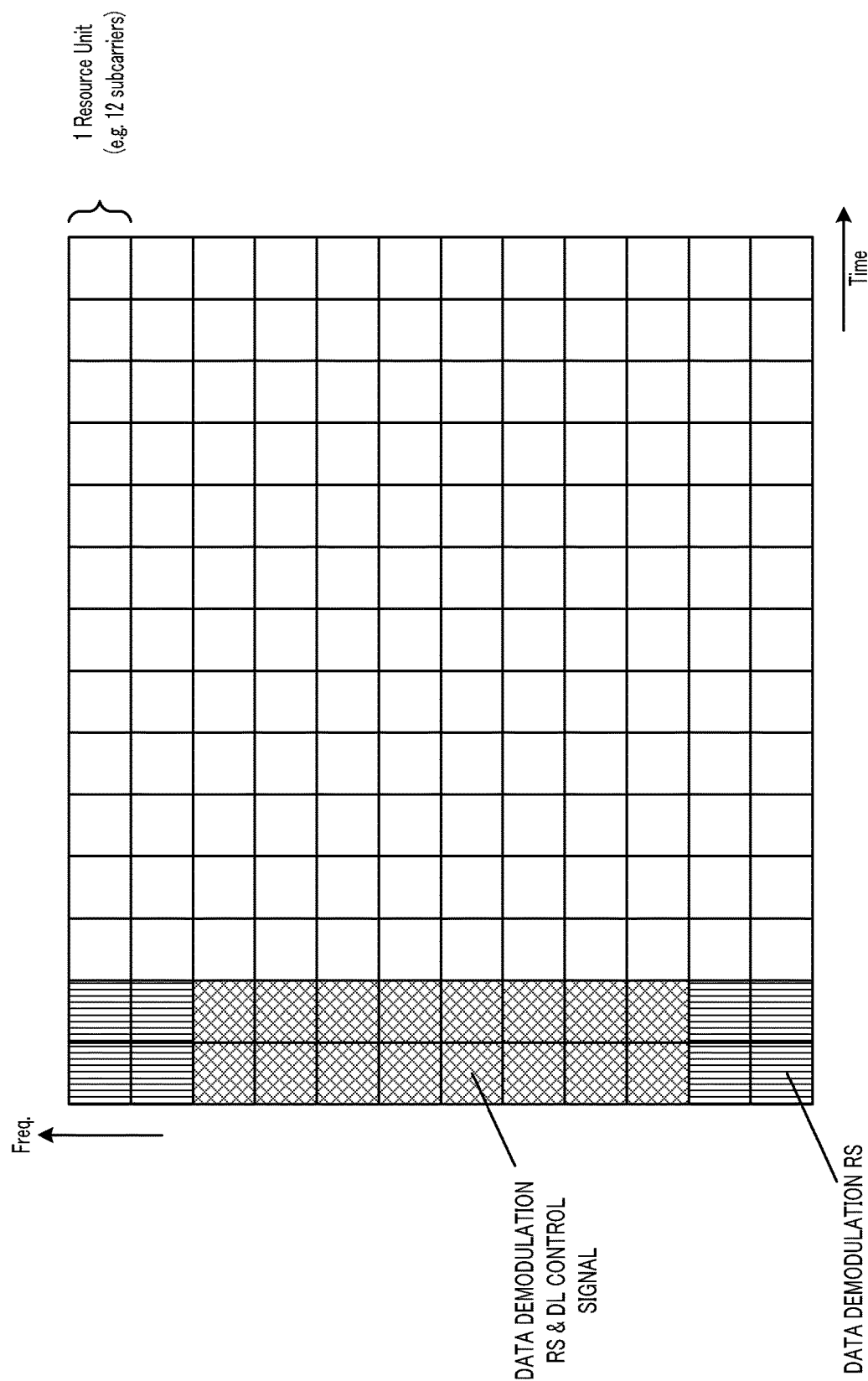
FIG. 12 illustrates a mapping example according to Modification Example 1 of Embodiment 2.

FIG. 12 illustrates a mapping example of the data demodulation RS and the DL control signal according to Modification Example 1 of Embodiment 2.

As illustrated in FIG. 12, at the first and second symbols in the subframe, the data demodulation RS is mapped to all the 12 resource units. Meanwhile, the DL control signal is mapped to 8 resource units among 12 resource units. In other words, the data demodulation RS and the DL control signal have different bandwidths. In other words, the bands assigned the data demodulation RS and the DL control signal are partially different from each other.

As described above, the bandwidths or bands where the data demodulation RS and the DL control signal are mapped are configured to be different from each other, which can improve the design flexibility of mapping each signal and reduce the overhead caused by mapping unnecessary (or excessive) signals.

Modification Example 2 of Embodiment 2

The data demodulation RS and the DL control signal may be mapped according to the resource assigned to user terminal 20 (sometimes simply called a user), or be mapped independently of the resource assigned to user terminal 20.

Figure 13:
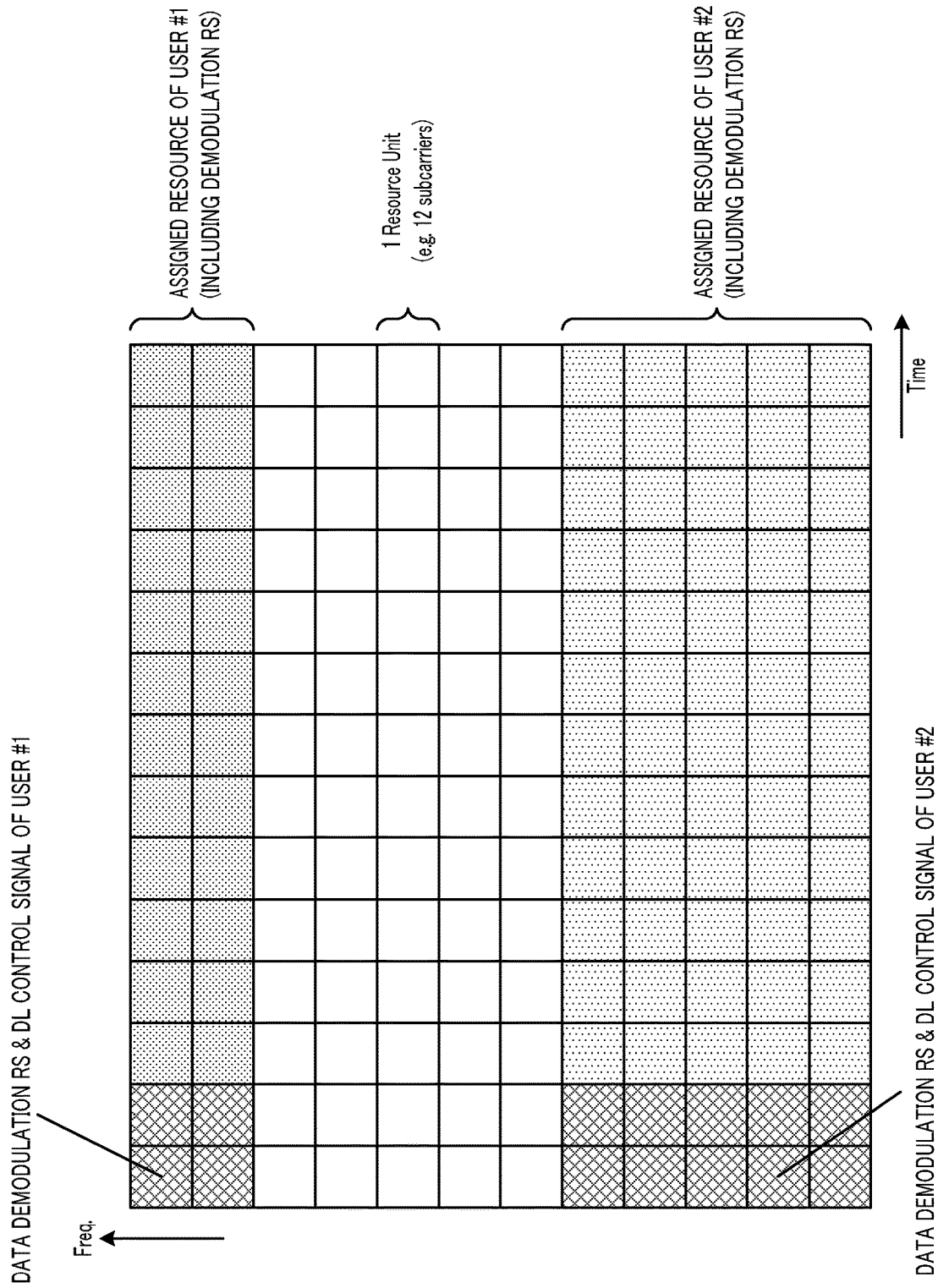
FIG. 13 illustrates a mapping example according to Modification Example 2 of Embodiment 2.
Figure 14:
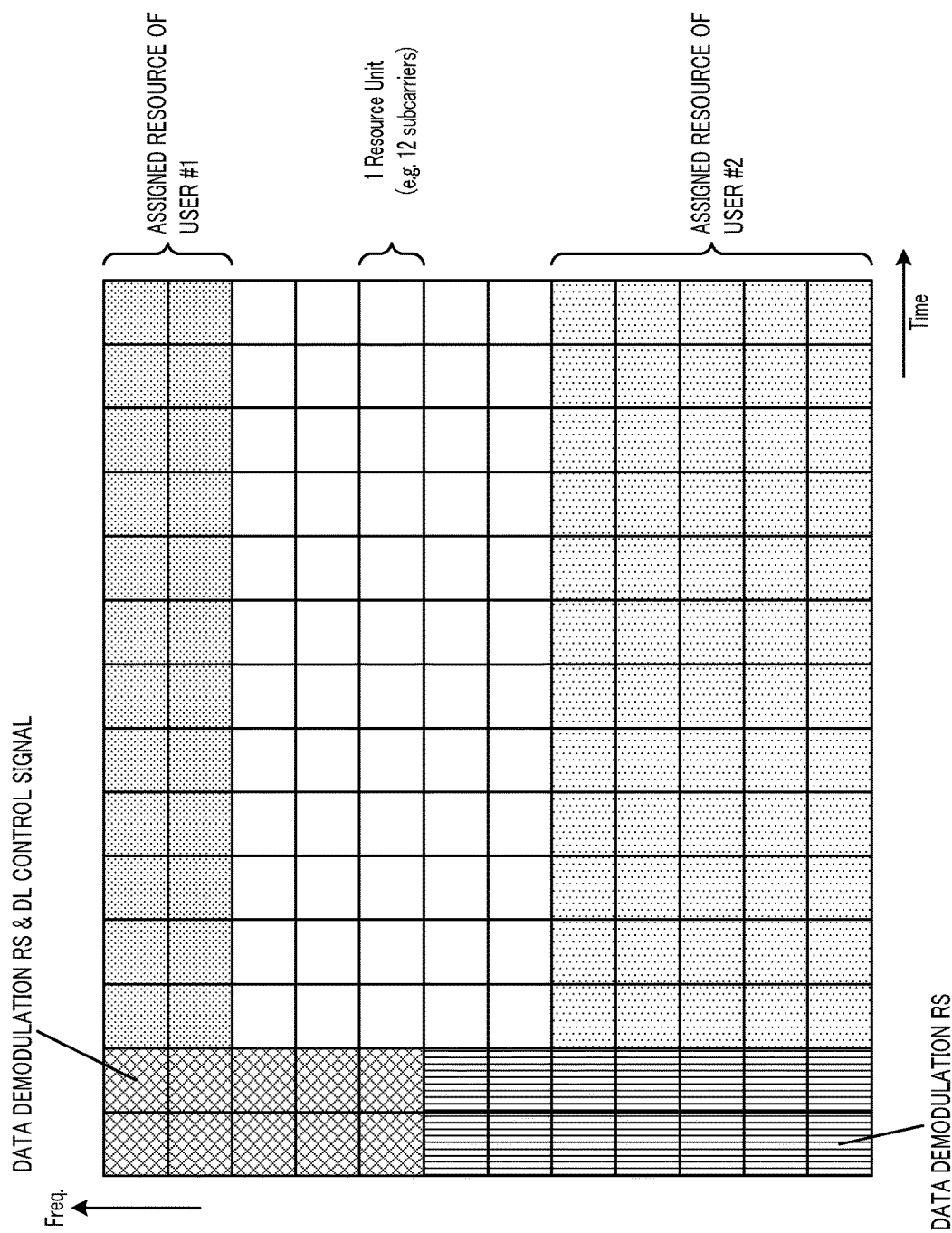
FIG. 14 illustrates a mapping example according to Modification Example 2 of Embodiment 2.

FIGS. 13 and 14 illustrate a mapping example of the data demodulation RS and the DL control signal according to Modification Example 2 of Embodiment 2.

In FIGS. 13 and 14, two resource units (the first and second resource units from the top) are assigned to the DL data signal (for example, PDSCH) for user #1. Five resource units (the first to fifth resource units from the bottom) are assigned to the DL data signal (for example, PDSCH) for user #2.

In FIG. 13, the data demodulation RS and the DL control signal are mapped to the band identical to that of the resource assigned to user terminal 20. Specifically, as illustrated in FIG. 13, the demodulation RSs for user #1 and user #2 are mapped to bands identical to resources assigned to the DL data signals destined for the respective users.

The mapping illustrated in FIG. 13 can simplify the resource assignment (scheduling) to the DL data signal, the data demodulation RS and the DL control signal for each user terminal 20. The pre-coding (identical to that for the DL data signal) for this user terminal 20 can be applied to the DL control signal. Consequently, this user terminal 20 can effectively enjoy the pre-coding gain for the DL control signal.

Meanwhile, in FIG. 14, the data demodulation RS and the DL control signal are mapped independently of the resource assigned to user terminal 20.

Specifically, as illustrated in FIG. 14, the demodulation RS is mapped to all the bands, and the DL control signal is mapped to five resource units (the first to fifth resource units from the top).

According to the mapping illustrated in FIG. 14, the data demodulation RS and the DL control signal can be mapped independently of the resource assigned the DL data signal. Consequently, the design flexibility of mapping each signal can be improved, and the overhead caused by mapping unnecessary (or excessive) signals can be reduced.

Modification Example 3 of Embodiment 2

The number of layers of the DL control signal may be identical to or different from the number of layers of the demodulation RS (that is, the number of layers of the DL data signal).

Figure 15:
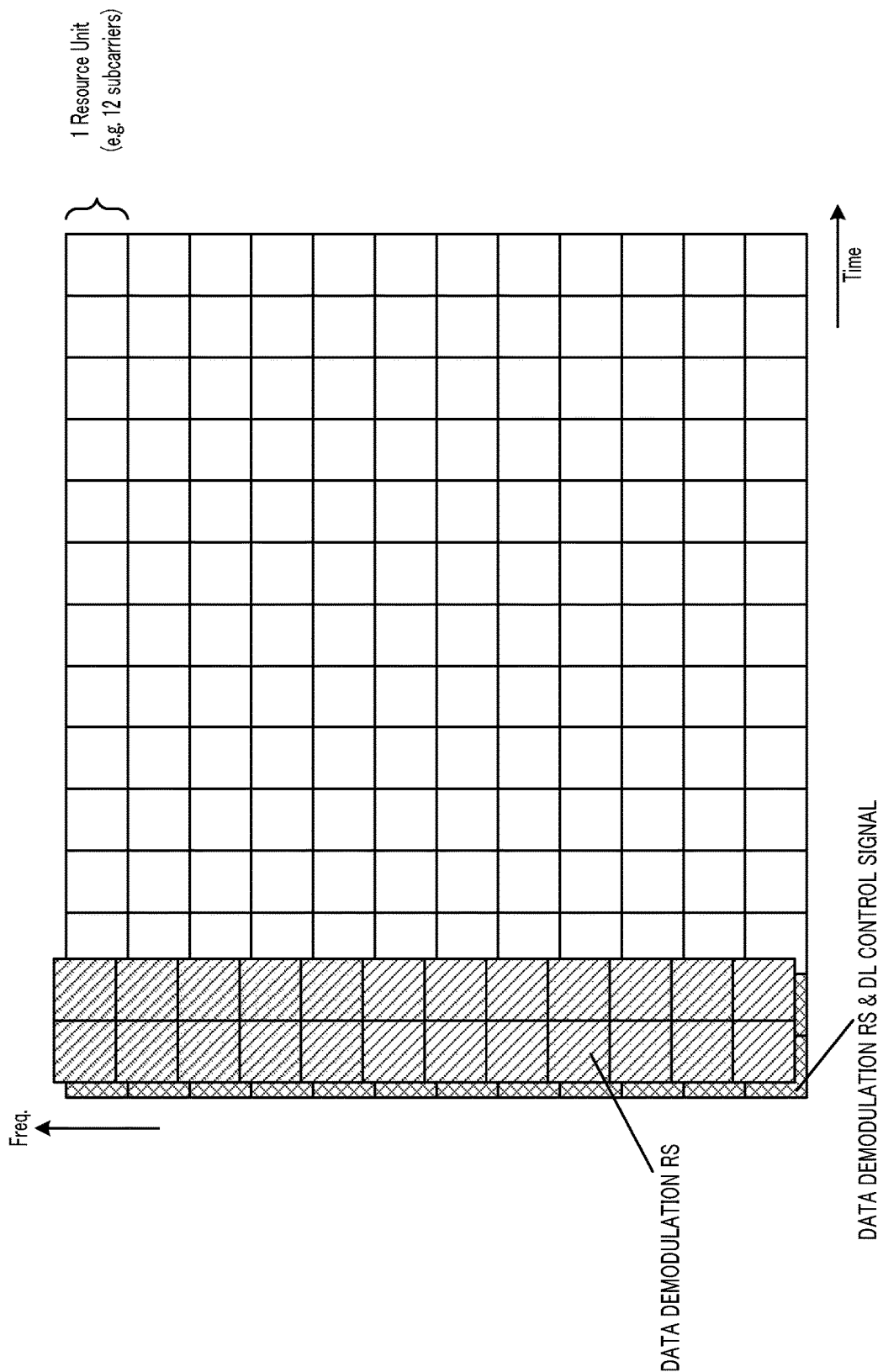
FIG. 15 illustrates a mapping example according to Modification Example 3 of Embodiment 2.
Figure 16:
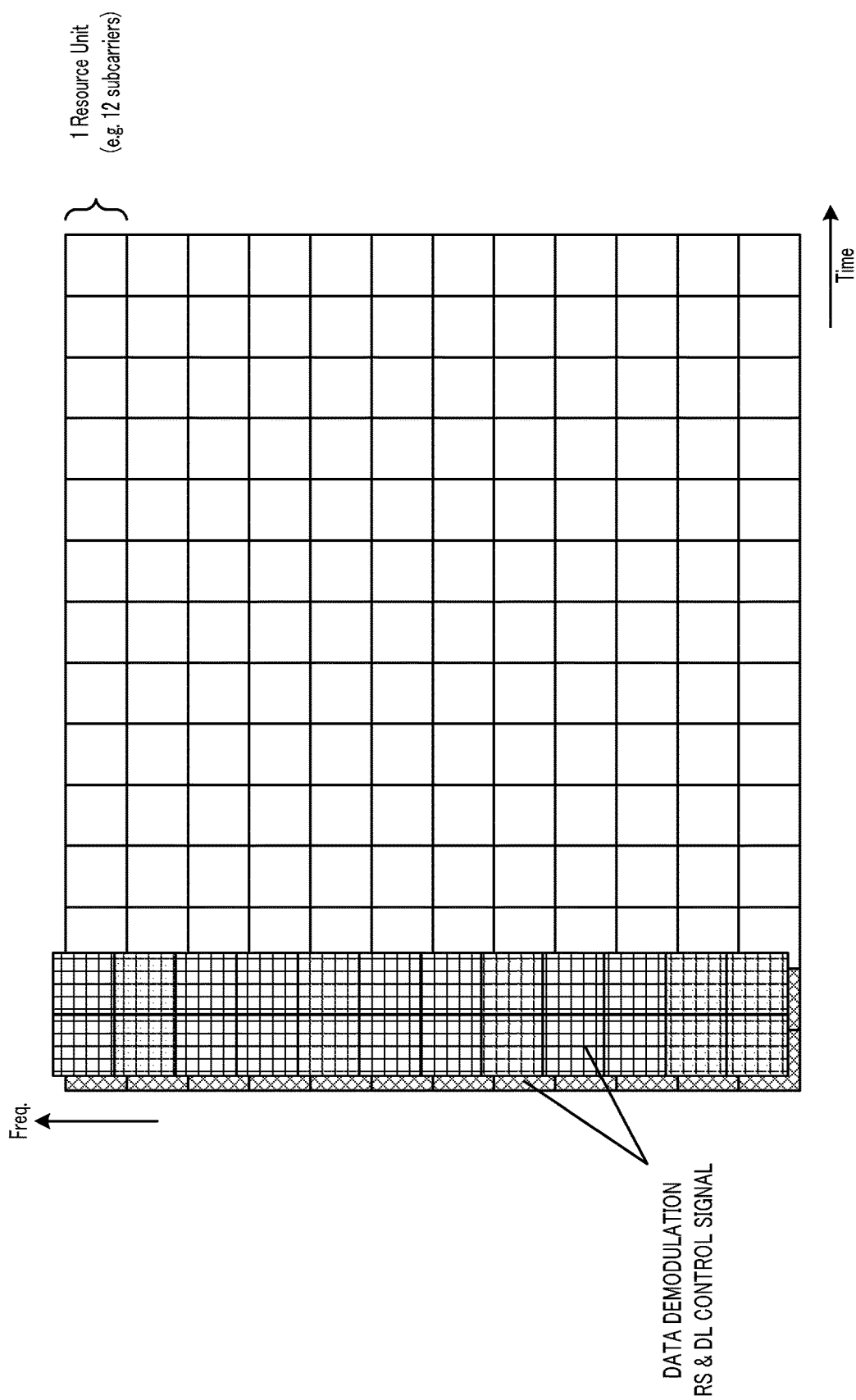
FIG. 16 illustrates a mapping example according to Modification Example 3 of Embodiment 2.

FIGS. 15 and 16 illustrate a mapping example of the data demodulation RS and the DL control signal according to Modification Example 3 of Embodiment 2.

In FIGS. 15 and 16, the number of layers of the DL data signal (data demodulation RS) is two. In FIG. 15, the number of layers of the DL control signal is one. In FIG. 16, the number of layers of the DL control signal is two, which is identical to that of the DL data signal.

In FIGS. 15 and 16, in a case where the port number of the antenna port used to transmit the DL control signal is the same as that of any data demodulation RS (DL data signal), the data demodulation RS can be utilized to demodulate the DL control signal. On the contrary, in a case where the port number of the antenna port used to transmit the DL control signal is different from each data demodulation RS (DL data signal), the control signal demodulation RS is multiplexed (not illustrated).

Here, as described in Embodiment 1, the one-layer transmission improves the reception quality even though the transmission rate of the DL control signal is reduced in comparison with the multiple-layer multiplexing. In other words, the multiple-layer multiplexing reduces the reception quality even though the transmission rate of the DL control signal is increased in comparison with the one-layer transmission. Typically, the DL control signal is information that is more important than the DL data signal.

Accordingly, for example, the number of layers of the DL control signal may be determined according to whether the reception quality required for the DL control signal is satisfied or not. This processing prevents signaling overhead and latency time from increasing while maintaining the reception quality required for the DL control signal, and can improve the reception quality of the DL control signal.

Modification Example 4 of Embodiment 2

The mapping pattern of the demodulation RS and the DL control signal (mapping configuration) may be different on a cell-by-cell basis (for example, radio base station 10 or the component carrier (CC)).

Figure 17B:
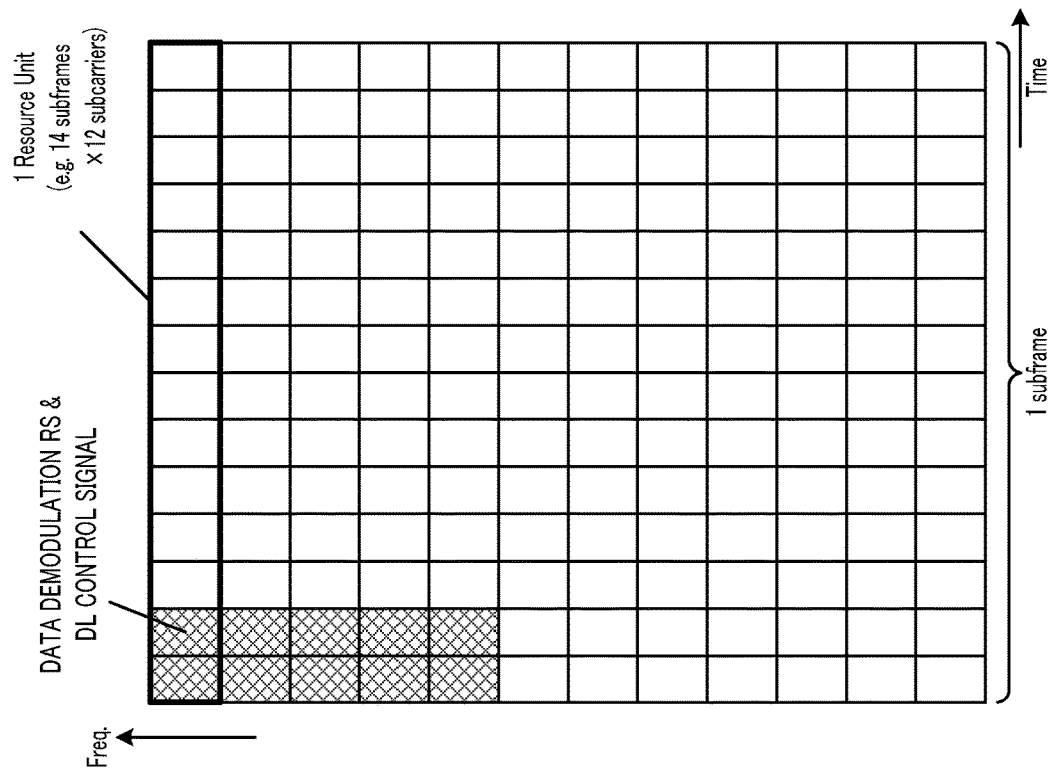
FIG. 17B illustrates a mapping example according to Modification Example 4 of Embodiment 2.
Figure 17A:
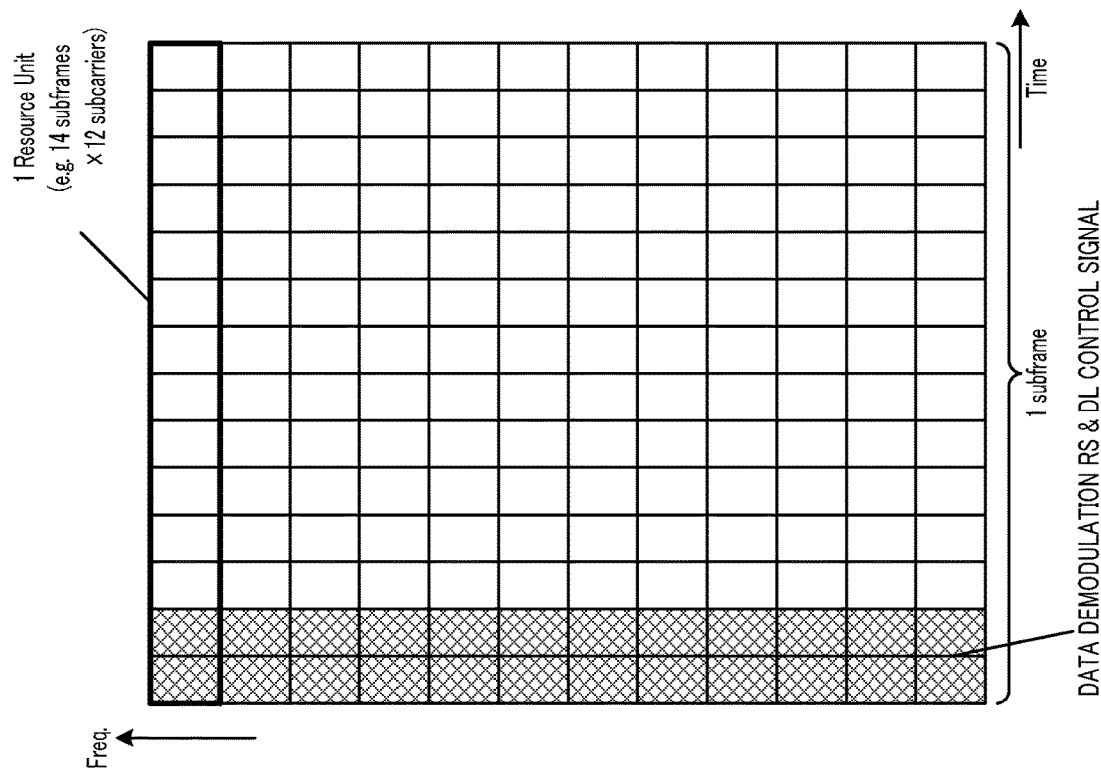
FIG. 17A illustrates a mapping example according to Modification Example 4 of Embodiment 2.

FIGS. 17A and 17B illustrate a mapping example of the data demodulation RS and the DL control signal according to Modification Example 4 of Embodiment 2. In FIGS. 17A and 17B, the mapping patterns of the data demodulation RSs and the DL control signals are different from each other. For example, in cell #1 (or radio base station #1, CC #1), the mapping pattern illustrated in FIG. 17A may be set. In cell #2 (or radio base station #2, CC #2), the mapping pattern illustrated in FIG. 17B may be set.

In this manner, the different configurations of the demodulation RSs and the DL control signals between cells can configure the mapping pattern in conformity with the communication environment on a cell-by-cell basis, improve the design flexibility of mapping each signal, and reduce the overhead caused by mapping unnecessary (excessive) signals.

Modification Example 5 of Embodiment 2

In Modification Example 5 of Embodiment 2, a case is described where the mapping pattern of the DL control signal (or the transmission bandwidth of the DL control signal) is configured in conformity with the amount of resources (capacity) assigned to the DL control signal.

FIGS. 18A to 18E illustrate a mapping example of the data demodulation RS and the DL control signal according to Modification Example 5 of Embodiment 2. In FIGS. 18A to 18E, the data demodulation RS is mapped to all the bands at the first and second symbols in the subframe.

Figure 18B:
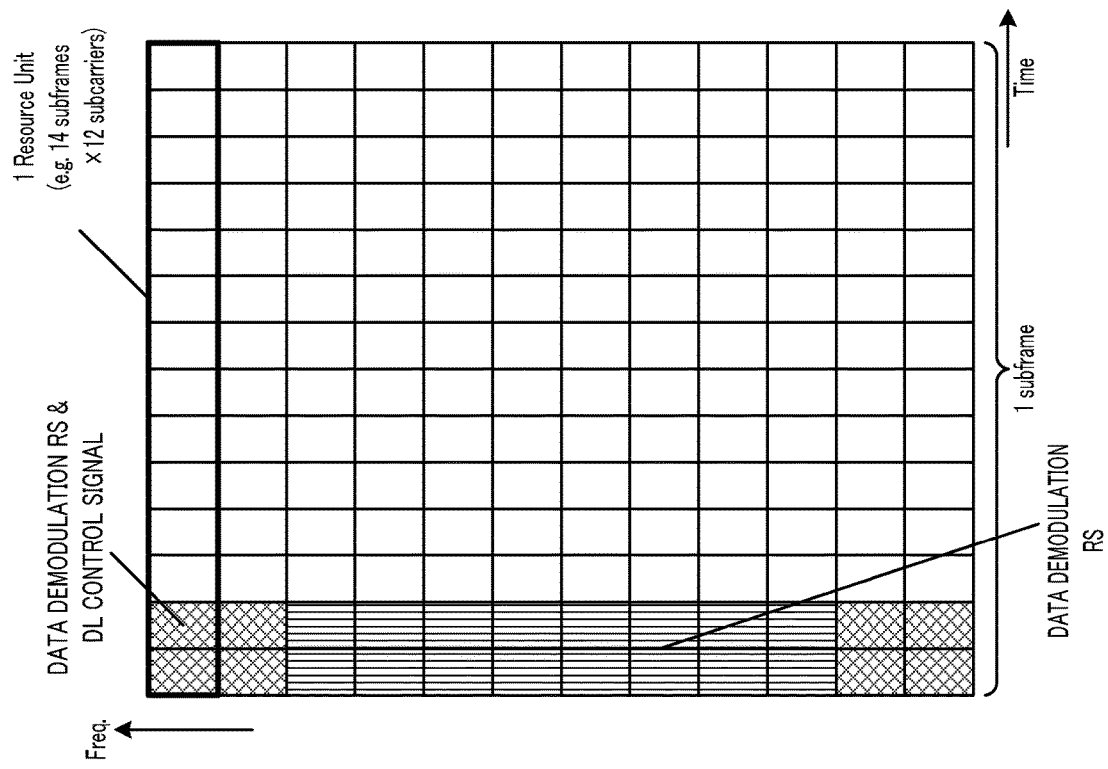
FIG. 18B illustrates a mapping example according to Modification Example 5 of Embodiment 2.
Figure 18A:
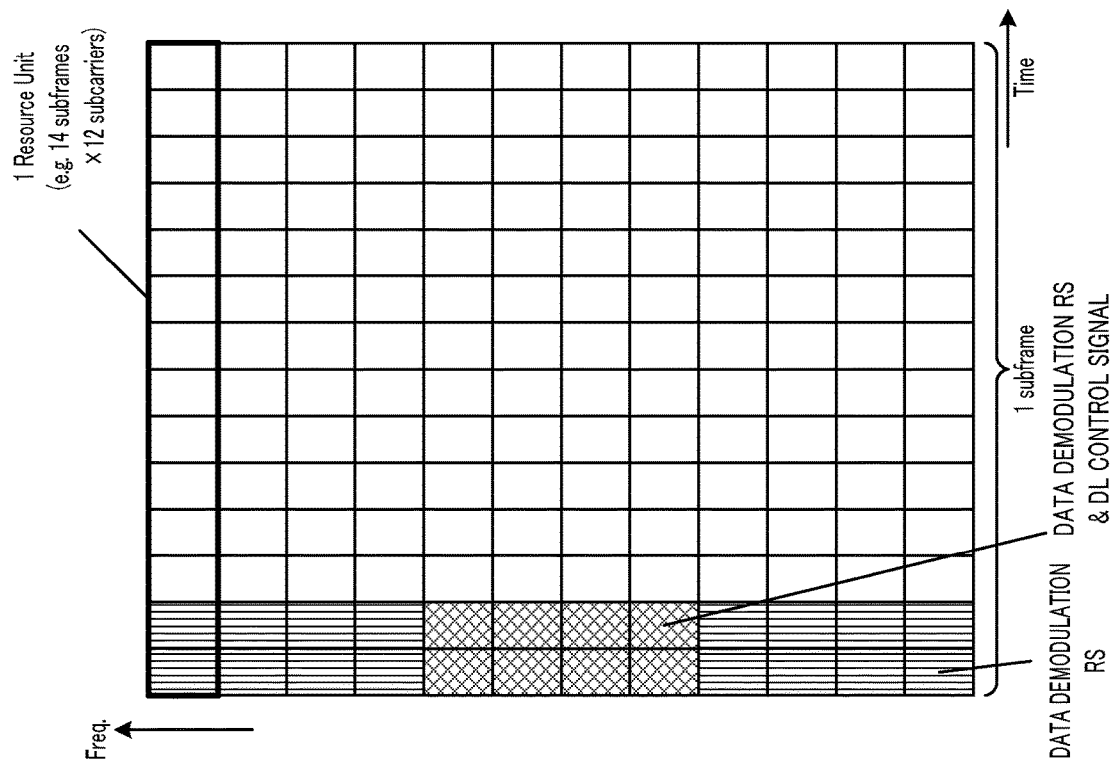
FIG. 18A illustrates a mapping example according to Modification Example 5 of Embodiment 2.

For example, the mapping pattern illustrated in FIG. 18A is a pattern example where the DL control signal is locally mapped in four resource units that are a relatively small amount of assigned resource (small capacity local mapping). A mapping pattern illustrated in FIG. 18B is a pattern example where the DL control signal is mapped in a distributed manner to four resource units that are a relatively small amount of assigned resource (small capacity distributed mapping).

Figure 18D:
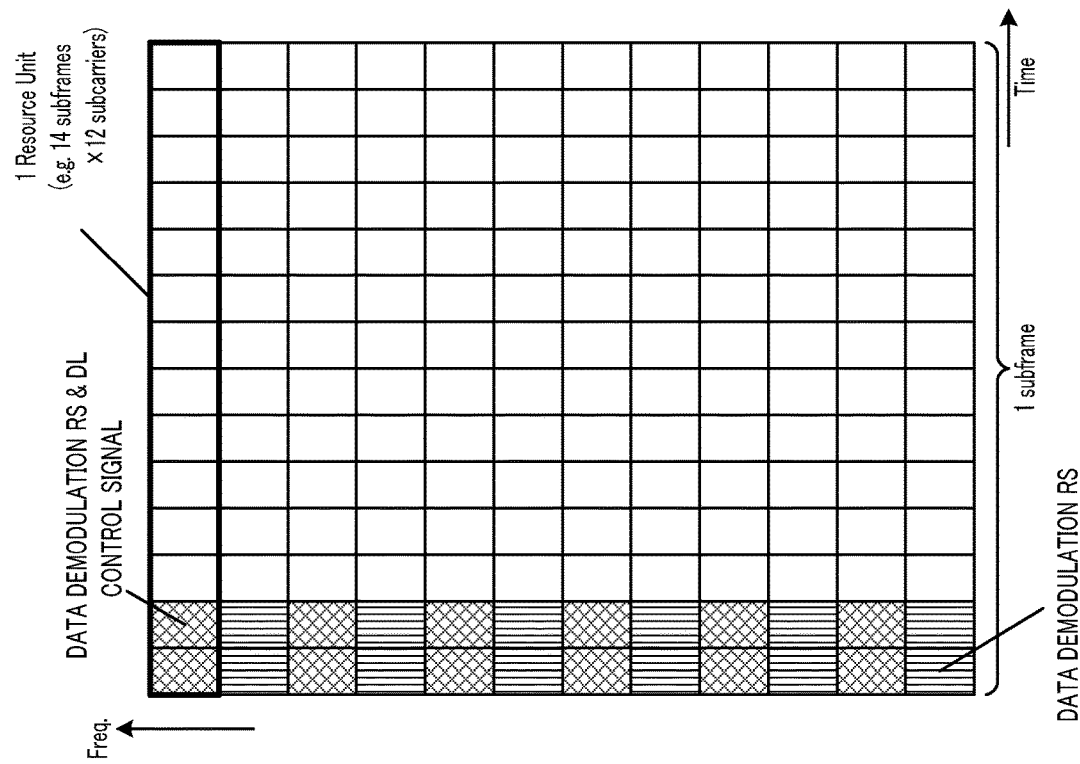
FIG. 18D illustrates a mapping example according to Modification Example 5 of Embodiment 2.
Figure 18C:
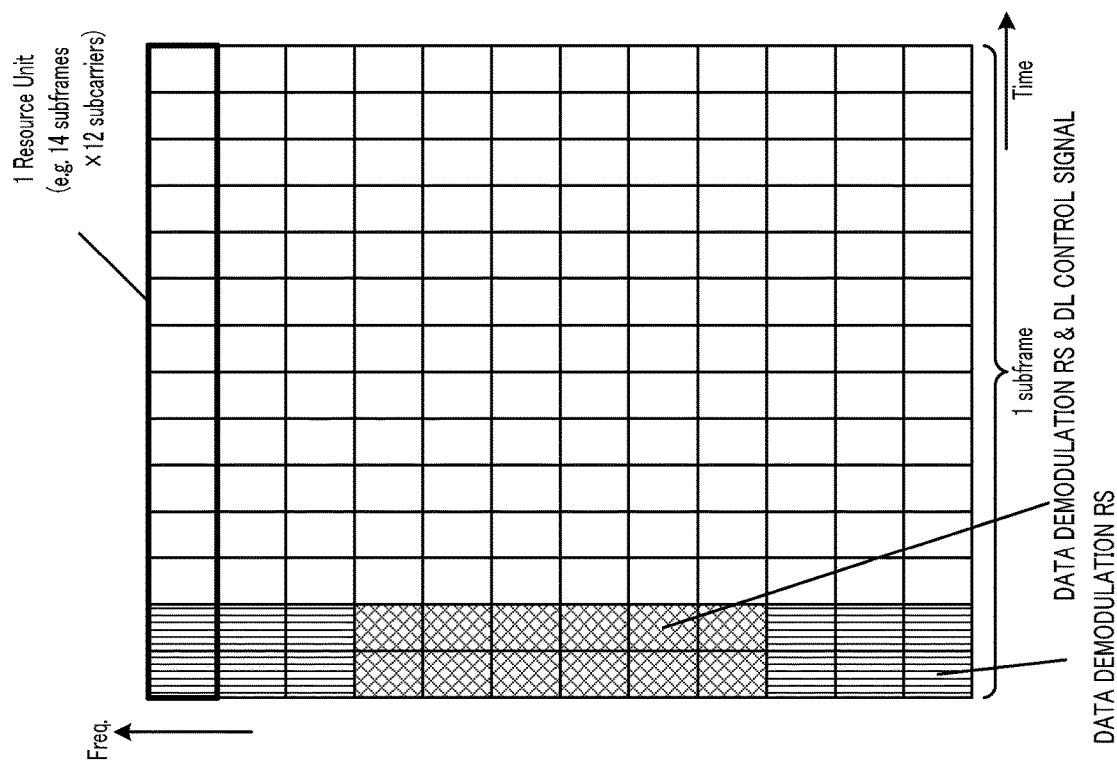
FIG. 18C illustrates a mapping example according to Modification Example 5 of Embodiment 2.

For example, a mapping pattern illustrated in FIG. 18C is a pattern example where the DL control signal is locally mapped to six resource units that are a medium amount of assigned resource (medium capacity local mapping). A mapping pattern illustrated in FIG. 18D is a pattern example where the DL control signal is mapped in a distributed manner to six resource units that are a medium amount of assigned resource (medium capacity distributed mapping).

Figure 18E:
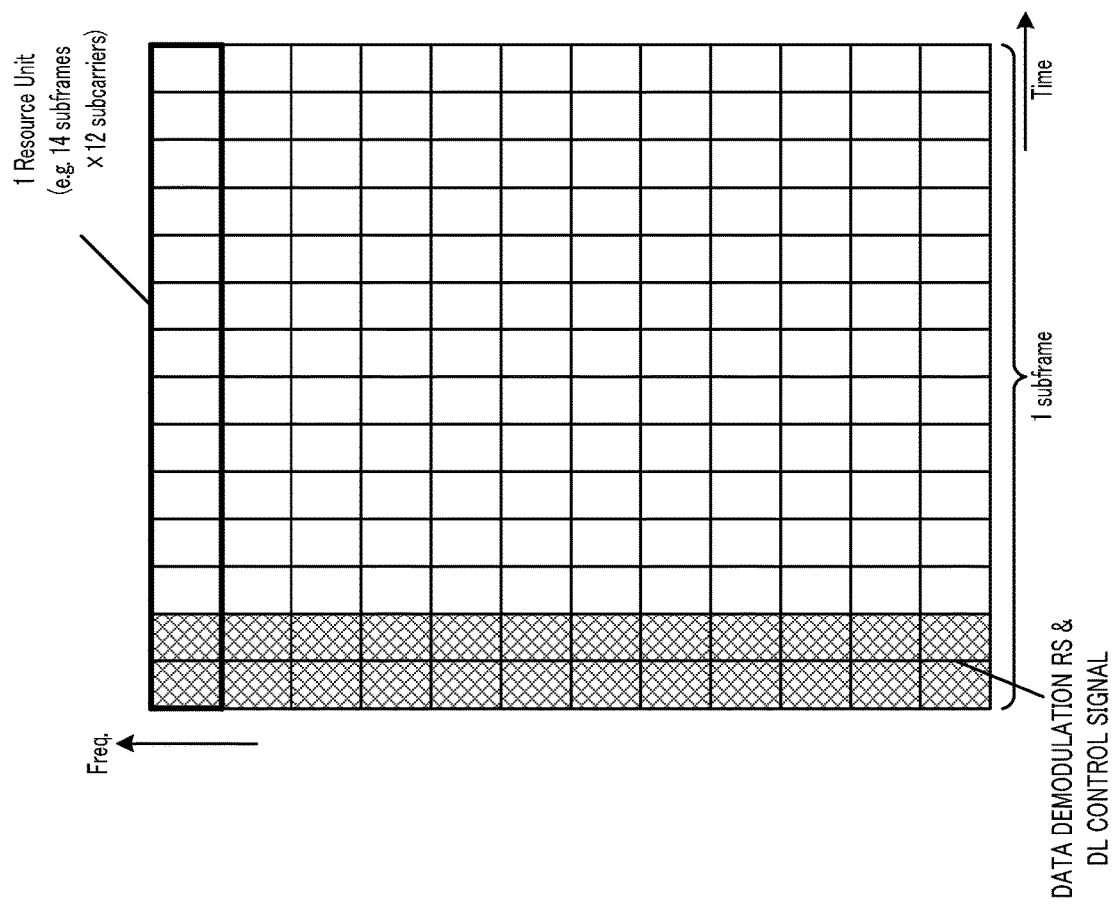
FIG. 18E illustrates a mapping example according to Modification Example 5 of Embodiment 2.

A mapping pattern illustrated in FIG. 18E is a pattern example where the DL control signal is mapped to 12 resource units that are a relatively large amount of assigned resource (large capacity).

The number (bandwidth) of resource units where the DL control signal is mapped, and the mapping position are not limited to the mapping patterns illustrated in FIGS. 18A to 18E.

Radio base station 10 and user terminal 20 may predefine multiple mapping patterns as in FIGS. 18A to 18E. In this case, user terminal 20 may identify the mapping position of the DL control signal destined for the own apparatus, through the blind detection process.

Specifically, first, as illustrated in FIGS. 18A to 18E, user terminal 20 calculates the channel estimation value using the demodulation RS mapped to the forward symbols (first and second symbols) in the subframe. Next, user terminal 20 performs a blind detection process for an area (mapping candidate) where the DL control signal can be mapped, in each of the mapping patterns, using the channel estimation value, thereby identifying the DL control signal destined for the own apparatus. User terminal 20 then receives the DL data signal according to the scheduling information (for example, the assigned resource) included in the identified DL control signal.

In this manner, the blind detection by user terminal 20 can reduce signaling for indication about the mapping pattern of the DL control signal to user terminal 20. The blind detection can also reduce the time for detecting the DL control signal in user terminal 20.

Modification Examples 1 to 5 of Embodiment 2 have thus been described above.

The mapping patterns illustrated in FIGS. 11 to 18E with reference to which Embodiment 2 has been described are only examples. The pattern is not limited to those. FIGS. 11 to 18E each illustrate, as an example, the case where the demodulation RS and the DL control signal are mapped to the beginning symbol in the subframe. However, the symbol to which the demodulation RS and the DL control signal are mapped is not limited to the beginning symbol. The symbol may be any forward symbol in the subframe (for example, any of a predetermined number of beginning symbols and/or the like) that can achieve low latency. In Embodiment 2, the number of symbols where the demodulation RS is mapped is not limited to two. Mapping may be made to one symbol or three or more symbols.

The mapping patterns (FIGS. 11 to 18E) described in Embodiment 2 may be configured in each subframe, or configured in some subframes.

In Embodiment 1 (FIG. 3) and Embodiment 2 (FIG. 11), one resource unit is defined by 168 REs including 14 symbols and 12 subcarriers. However, the definition of the resource unit (the number of symbols and the number of subcarriers) is not limited to this.

Each embodiment of the present invention has been described above.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 19:
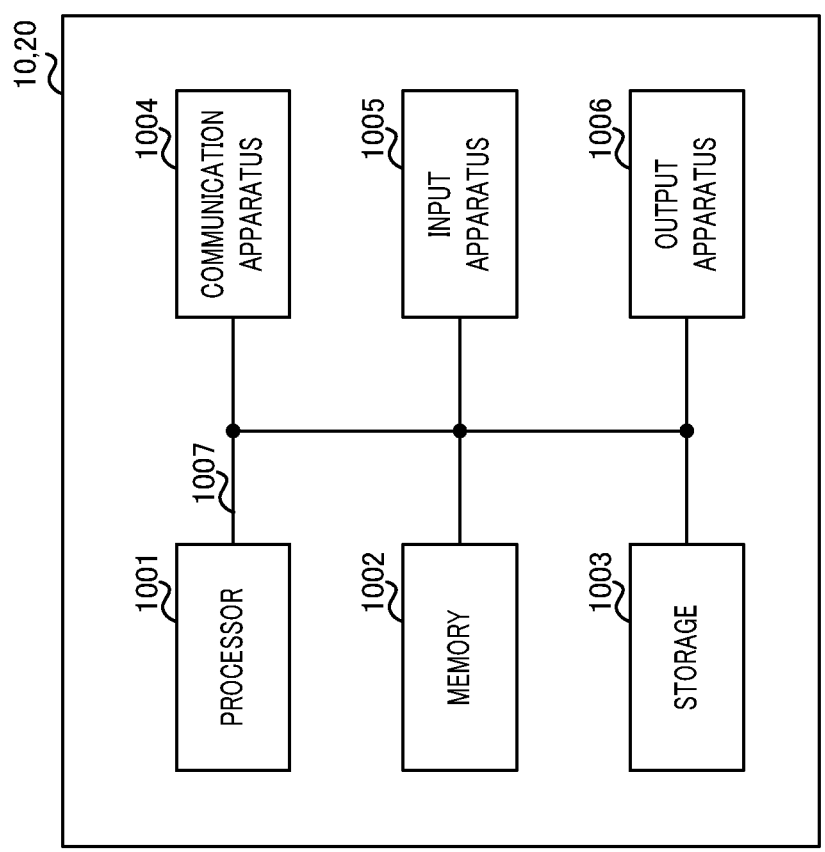
FIG. 19 illustrates an example of the hardware configurations of the radio base station and the user terminal according to the present invention.

For example, the radio base station, the user terminal, and/or the like, according to an embodiment of the present invention may function as computers which perform processing of the radio communication method of the present invention. FIG. 19 illustrates an example of hardware configurations of the radio base station and the user terminal according to an embodiment of the present invention. The above-described radio base station 10 and user terminal 20 may be physically configured as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, controller 101, transmission signal generator 102, pre-coding processor 103, mapper 104, IFFT processor 105, FFT processor 203, signal separator 204, channel estimator 205, demodulator and decoder 206 and/or the like, which have been described above, may be achieved by processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, controller 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitter 106, antenna 107, antenna 201, receiver 202 and/or the like, which have been described above, may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

Modifications of Present Invention

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like. The reference signal can also be abbreviated as RS and may also be called a pilot depending on the applied standard.

The DL data signal may be called a physical downlink shared channel (PDSCH) or a downlink data channel. The DL control signal may be called a physical downlink control channel (PDCCH) or a downlink control channel.

The radio frame may be constituted by one frame or a plurality of frames in the time domain. The one frame or each of the plurality of frames may be called a subframe, a time unit, and/or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, and/or the like) in the time domain.

The radio frame, the subframe, the slot, and the symbol each represent a time unit for signal transmission. The radio frame, the subframe, the slot, and the symbol may be called in different ways corresponding to the respective items.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe may be called TTI. Multiple consecutive subframes may be called TTI. One slot may be called TTI.

The resource unit is a resource assignment unit in the time domain and the frequency domain, and the resource unit may include one subcarrier or a plurality of continuous subcarriers in the frequency domain. The time domain of the resource unit may include one or more symbols, or have the length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the number of symbols and resource blocks included in the slot, and the number of subcarriers included in the resource block can be changed in various ways.

The indication of information is not limited to the aspects or embodiments described in the present specification, and the information may be indicated by another method. For example, the indication of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

The radio base station in the present specification can be replaced with the user terminal. For example, each mode/embodiment of the present invention may be applied to a configuration where the communication between the radio base station and the user terminal is replaced with communication between multiple user terminals (Device-to-Device: D2D). In this case, a configuration where user terminal 20 has the function that radio base station 10 described above has, may be adopted. The term "uplink" or "downlink" can be replaced with "side." For example, the uplink channel can be replaced with a side channel.

Likewise, the user terminal in the present specification can be replaced with the radio base station. In this case, a configuration where radio base station 10 has the function that user terminal 20 described above has, may be adopted.

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

The information, the signals, and/or the like can be output from a higher layer (or a lower layer) to a lower layer (or a higher layer). The information, the signals, and/or the like may be input and output through a plurality of network nodes.

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

The determination may be made based on a value expressed by one bit (0 or 1), based on a Boolean value (true or false), or based on comparison with a numerical value (for example, comparison with a predetermined value).

As used herein, the term "determining" may encompass a wide variety of actions. For example, "determining" may be regarded as judging, calculating, computing, processing, deriving, investigating, looking up (for example, looking up in a table, a database or another data structure), ascertaining and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

When articles, such as "a," "an," and "the" in English, are added by translation in the entire disclosure, the articles include plural forms unless otherwise clearly indicated by the context.

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

The terms "system" and "network" used in the present specification can be interchangeably used.

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

The aspects and embodiments described in the present specification may be independently used, may be used in combination, or may be switched and used along the execution. Furthermore, indication of predetermined information (for example, indication that "it is X") is not limited to explicit indication, and may be performed implicitly (for example, by not indicating the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2016-154822 filed on Aug. 5, 2016, and the entire content of Japanese Patent Application No. 2016-154822 is hereby incorporated by reference.

INDUSTRIAL APPLICABILITY

An aspect of the present invention is useful for a mobile communication system.

REFERENCE SIGNS LIST

10 Radio base station
20 User terminal
101 Controller
102 Transmission signal generator
103 Pre-coding processor
104 Mapper
105 IFFT processor
106 Transmitter
107, 201 Antenna
202 Receiver
203 FFT processor
204 Signal separator
205 Channel estimator
206 Demodulator and decoder

The invention claimed is:

1. A terminal comprising:
a reception section that receives a signal of a downlink control channel and a signal of a downlink shared channel; and
a control section that controls a reception of a first demodulation reference signal and a second demodulation reference signal, the first demodulation reference signal being for demodulating the signal of the downlink control channel and the second demodulation reference signal being for demodulating the signal of the downlink shared channel,
wherein a port number for the signal of the downlink control channel is equal to a port number for the first demodulation reference signal.

2. The terminal according to claim 1, wherein
the first demodulation reference signal is mapped within a resource constituting the downlink control channel.

* * * * *